United States Patent
Shu et al.

(10) Patent No.: US 9,854,319 B2
(45) Date of Patent: Dec. 26, 2017

(54) METHOD OF PROCESSING NON-REAL TIME SERVICE AND BROADCAST RECEIVER

(71) Applicant: LG ELECTRONICS INC., Seoul (KR)

(72) Inventors: Jong Yeul Shu, Seoul (KR); Gomer Thomas, Princeton Junction, NJ (US); Jae Hyung Song, Seoul (KR); Jin Pil Kim, Seoul (KR); Ho Taek Hong, Seoul (KR); Joon Hui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 751 days.

(21) Appl. No.: 13/935,328

(22) Filed: Jul. 3, 2013

(65) Prior Publication Data

US 2013/0347041 A1    Dec. 26, 2013

Related U.S. Application Data

(63) Continuation of application No. 13/410,918, filed on Mar. 2, 2012, now Pat. No. 8,504,714, which is a (Continued)

(51) Int. Cl.
*H04N 21/433* (2011.01)
*H04N 21/482* (2011.01)
(Continued)

(52) U.S. Cl.
CPC .......... *H04N 21/482* (2013.01); *H04H 20/28* (2013.01); *H04H 20/40* (2013.01);
(Continued)

(58) Field of Classification Search
CPC .......... H04N 5/00; H04N 5/44; H04N 5/4403; H04N 5/445; H04N 7/00; H04N 7/002;
(Continued)

(56) References Cited

U.S. PATENT DOCUMENTS 6,771,657 B1    8/2004   Elstermann
7,975,281 B2 *  7/2011   Song ................ H04N 21/41407
                                                 370/312
(Continued)

FOREIGN PATENT DOCUMENTS

JP    2000-032409    1/2000
JP    2003-244599    8/2003
(Continued)

OTHER PUBLICATIONS

RFC 3926—FLUTE—File Delivery over Unidirectional Transport, Oct. 2004, IETF Tools.*

*Primary Examiner* — Brian J Gillis
*Assistant Examiner* — Boris Grijalva Lobos
(74) *Attorney, Agent, or Firm* — Dentons US LLP

(57) ABSTRACT

A method of receiving and process a broadcast signal including a Non-Real Time (NRT) service and a broadcast receiver are disclosed herein. A method of processing a broadcast signal including a Non-Real Time (NRT) service, the method comprises receiving and processing a signaling information table including access information of the NRT service, receiving and storing data of the NRT service based on the signaling information table in non-real time, extracting access information of additional information relating to the NRT service from the signaling information table, and downloading the additional information relating to the NRT service based on the extracted access information.

4 Claims, 23 Drawing Sheets

Related U.S. Application Data continuation of application No. 12/654,077, filed on Dec. 9, 2009, now Pat. No. 8,156,237.

(60) Provisional application No. 61/121,178, filed on Dec. 9, 2008, provisional application No. 61/121,181, filed on Dec. 9, 2008, provisional application No. 61/138,494, filed on Dec. 17, 2008, provisional application No. 61/153,973, filed on Feb. 20, 2009, provisional application No. 61/153,985, filed on Feb. 20, 2009, provisional application No. 61/160,689, filed on Mar. 16, 2009, provisional application No. 61/226,259, filed on Jul. 16, 2009.

(51) Int. Cl.
*H04H 20/28* (2008.01)
*H04H 20/40* (2008.01)
*H04N 21/434* (2011.01)

(52) U.S. Cl.
CPC ..... *H04N 21/4334* (2013.01); *H04N 21/4345* (2013.01); *H04H 2201/40* (2013.01)

(58) Field of Classification Search
CPC .......... H04N 7/025; H04N 7/14; H04N 7/141; H04N 13/00; H04N 13/0003; H04N 13/0062–13/007; H04N 13/0074; H04N 13/0096; H04N 21/00; H04N 21/20; H04N 21/23; H04N 21/231; H04N 21/234; H04N 21/23418; H04N 21/2343; H04N 21/235; H04N 21/24; H04N 21/25; H04N 21/40; H04N 21/41; H04N 21/414; H04N 21/4147; H04N 21/43; H04N 21/435; H04N 21/4351; H04N 21/482–21/4828; H04N 21/61–21/6193; H04N 21/63; H04N 21/80; H04N 21/84; H04N 21/845; H04L 7/00; H04L 7/0004; H04L 29/00; H04L 29/02; H04L 29/06; H04L 29/0602; H04L 29/06027; H04L 29/06176; H04L 29/06183; H04L 29/06319; H04L 29/06353; H04L 29/06387–29/06408; H04L 29/06448–29/06476; H04L 29/06517; H04L 65/00–65/1009; H04L 65/1066; H04L 65/1083; H04L 67/00; H04L 67/14; H04L 67/16; H04L 67/20; H04L 67/22; H04L 67/28; H04L 67/2804; G06F 11/00; G06F 11/30; G06F 15/00; G06F 15/16; G06F 17/00

See application file for complete search history.

(56) References Cited

U.S. PATENT DOCUMENTS

| | | | |
|---|---|---|---|
| 8,250,619 B2 | 8/2012 | Song et al. | |
| 8,489,762 B2 * | 7/2013 | McGinn | H04N 21/23605 709/225 |
| 8,503,335 B2 * | 8/2013 | Park | H04W 72/005 370/265 |
| 8,561,110 B2 * | 10/2013 | Eyer | H04N 21/235 725/40 |
| 8,717,961 B2 * | 5/2014 | Ryu | H04H 20/72 370/312 |
| 2002/0174189 A1 | 11/2002 | Peng | |
| 2007/0261074 A1 | 11/2007 | Yun | |
| 2009/0185562 A1 * | 7/2009 | Kannan | H04L 12/1886 370/389 |
| 2009/0296624 A1 * | 12/2009 | Ryu | H04H 20/72 370/312 |
| 2010/0027613 A1 | 2/2010 | Zimmerman et al. | |
| 2010/0034140 A1 * | 2/2010 | Song | H04N 21/235 370/328 |
| 2010/0134701 A1 * | 6/2010 | Eyer | H04N 21/235 348/731 |
| 2010/0183077 A1 * | 7/2010 | Lee | H04N 19/61 375/240.24 |
| 2010/0195712 A1 * | 8/2010 | Yu | H04N 19/61 375/240.01 |
| 2010/0277568 A1 * | 11/2010 | Yun | H04N 13/0051 348/43 |
| 2010/0309387 A1 * | 12/2010 | Eyer | H04N 21/235 348/731 |

FOREIGN PATENT DOCUMENTS

| KR | 10-2006-0042291 | 5/2006 |
|---|---|---|
| KR | 10-2008-0055280 | 6/2008 |

* cited by examiner

FIG. 4

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| data_service_table_bytes() { | | |
|   sdf_protocol_version | 8 | uimsbf |
|   application_count_in_section | 8 | uimsbf |
|   if(application_count_in_section > 0) { | | |
|     for(j = 0; j <application_count_in_section; j++) { | | |
|       compatibility_descriptor() | | |
|       app_id_byte_length | 16 | uimsbf |
|       if(app_id_byte_length > 1) { | | |
|         app_id_description | 16 | uimsbf |
|         for(i=0;i<app_id_byte_length-2;i++) { | | |
|           app_id_byte | 8 | bslbf |
|         } | | |
|       } | | |
|       tap_count | 8 | uimsbf |
|       for(i=0;i<tap_count; i++) { | | |
|         protocol_encapsulation | 8 | uimsbf |
|         action_type | 7 | uimsbf |
|         resource_location | 1 | bslbf |
|         Tap() | | |
|         tap_info_length | 16 | uimsbf |
|         for(k=0; k<N; k++) { | | |
|           descriptor() | | |
|         } | | |
|       } | | |
|       app_info_length | 16 | uimsbf |
|       for(i=0; i<M; i++) { | | |
|         descriptor() | | |
|       } | | |
|       app_data_length | 16 | uimsbf |
|       for(i=0; i<app_data_length; i++) { | | |
|         app_data_byte | 8 | bslbf |
|       } | | |
|     } | | |
|   } | | |
|   service_info_length | 16 | uimsbf |
|   for(j=0; j<K; j++) | | |
|     descriptor() | | |
|   } | | |
|   service_private_data_length | 16 | uimsbf |
|   for(j=0; j<service_private_data_length; j++){ | | |
|     service_private_data_byte | 8 | bslbf |
|   } | | |
| } | | |

FIG. 10

| Syntax | No.of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | '11111111' |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (i=0;i< num_NRT_services; i++) | | |
|   { | | |
|     NRT_service_id | 16 | uimsbf |
|     reserved | 2 | '11' |
|     NRT_service_status | 2 | uimsbf |
|     SP_indicator | 1 | bslbf |
|     short_NRT_service_name_length /' m '/ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |

FIG. 11

```
            num_component_level_descriptors                          4        uimsbf
            for (k=0;k< num_components_level_descriptors; k++)
            {
                component_level_descriptor()                         var
            }
        }
        reserved                                                     4        '1111'
        num_NRT_service_level_descriptors                            4        uimsbf
        for (m=0; m<num_NRT_service_level_descriptors; m++)
        {
            NRT_service_level_descriptor()                           var
        }
    }
    reserved                                                         4        '1111'
    num_virtual_channel_level_descriptors                            4        uimsbf
    for (n=0; n<num_virtual_channel_level_descriptors; n++) {
    {
        virtual_channel_level_descriptor()                           var
    }
}
```

FIG. 12

| Syntax | No.of Bits | Format |
|---|---|---|
| NRT_component_descriptor() { | | |
|    descriptor_tag | 8 | 0 x CB |
|    descriptor_length | 8 | uimsbf |
|    component_type | 7 | uimsbf |
|    component_encryption_flag | 1 | |
|    if (component_encryption_flag == '1') { | | |
|       num_STKM_streams | 8 | uimsbf |
|       for (i=0; i<num_STKM_streams; i++) { | | |
|          STKM_stream_id | 8 | uimsbf |
|       } | | |
|    } | | |
|    NRT_component_data(component_type) | var | |
| } | | |

FIG. 13

| Syntax | No. of Bits | Format |
|---|---|---|
| NRT_component_data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1') { | | |
|      tias_bandwidth | 16 | uimsbf |
|    } | | |
|    if (as_bandwidth_indicator == '1') { | | |
|      as_bandwidth | 16 | uimsbf |
|    } | | |
|    if (FEC_OTI_indicator == '1') { | | |
|      FEC_encoding_id | 8 | uimsbf |
|      FEC_instance_id | 16 | uimsbf |
|    } | | |
| } | | |

FIG. 14

| Syntax | No. of Bits | Format |
|---|---|---|
| NRT_information_table_section() { | | |
|     table_id | 8 | 0xTBD |
|     section_syntax_indicator | 1 | '1' |
|     private_indicator | 1 | '1' |
|     reserved | 2 | '11' |
|     section_length | 12 | uimsbf |
|     service_id | 16 | uimsbf |
|     reserved | 2 | '11' |
|     NRT_IT_version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     time_span_start | 32 | uimsbf |
|     reserved | 5 | '11111' |
|     time_span_length | 11 | uimsbf |
|     num_items_in_section | 8 | uimsbf |
|     for (j=0; j< num_items_in_section; j++) { | | |
|         content_linkage | 32 | uimsbf |
|         updates_available | 1 | bslbf |
|         reserved | 1 | '1' |
|         TF_available | 1 | bslbf |
|         low_latency | 1 | bslbf |
|         playback_length_in_seconds | 20 | uimsbf |
|         content_length_included | 1 | bslbf |
|         playback_delay_included | 1 | bslbf |
|         expiration_included | 1 | bslbf |
|         reserved | 1 | '1' |
|         duration | 12 | uimsbf |

FIG. 15

| | | |
|---|---|---|
| if (content_length_included==1) { | | |
|     content_length | 40 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
|     content_descriptor() | | |
| } | | |
| } | | |
| reserved | 6 | '111111' |
| descriptors_length | 10 | uimsbf |
| for (i=0; i<M; i++) { | | |
|     descriptor() | | |
| } | | |
| } | | |

FIG. 16

| Syntax | No.of Bits | Format |
|---|---|---|
| NRT_service_related_material_descriptor ( ) { | | |
|     descriptor_tag | 8 | 0xTBD |
|     descriptor_length | 8 | uimsbf |
|     URI_count | 8 | uimsbf |
|     for(i=0; i<URI_count;i++){ | | |
|         URI_type | 4 | uimsbf |
|         URI_access_type | 4 | uimsbf |
|         Related_Type | 8 | uimsbf |
|         RM_service_id | 16 | uimsbf |
|         RM_content_id | 32 | uimsbf |
|         Recommended_speed | 8 | uimsbf |
|         RM_file_URI_length | 8 | uimsbf |
|         RM_file_URI | var | |
|     } | | |
| } | | |

FIG. 17

| Value | URI_type |
|---|---|
| 0 | Still Image File (LOGO, POSTER, THUMNAIL) |
| 1 | Audio File |
| 2 | Audio/Video Clip(Short Video Clip) |
| 3 | Text File |
| 4 ~ 15 | Reserved |

FIG. 18

| Value | URI_access_type |
|---|---|
| 0 | File can be received by FLUTE protocol |
| 1 | File can be obtained by internet access |
| 2 ~ 15 | Reserved |

FIG. 19

| Value | Related_type |
|---|---|
| 0 | Trailer/preview |
| 1 | Logo/Poster |
| 2 | Still Shot |
| 3 | Commercial advert/Promotional Material |
| 4 | Direct product purchase |
| 5 | Review - Comments from viewers / critics |
| 6 | Bulletin Board |
| 7 | Music Video/OST |
| 8~255 | Reserved |

FIG. 20
| SERVICE GUIDE | | | |
|---|---|---|---|
| 11/30 | 6 : 00 | 7 : 00 | 8 : 00 |
| KBS | | NRT Service 1 | |
| MBC | NRT Service 2 | | NRT Service 3 |
| SBS | NRT Service 4 | | |
(a)
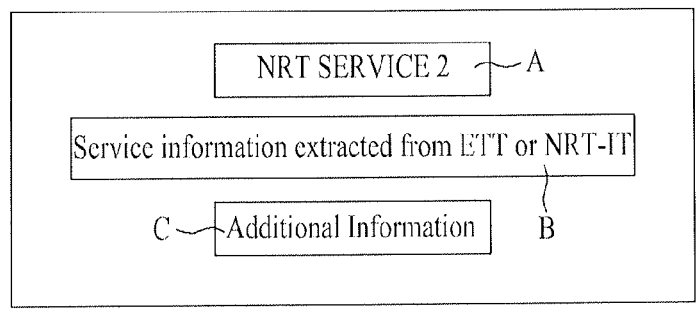
(b)
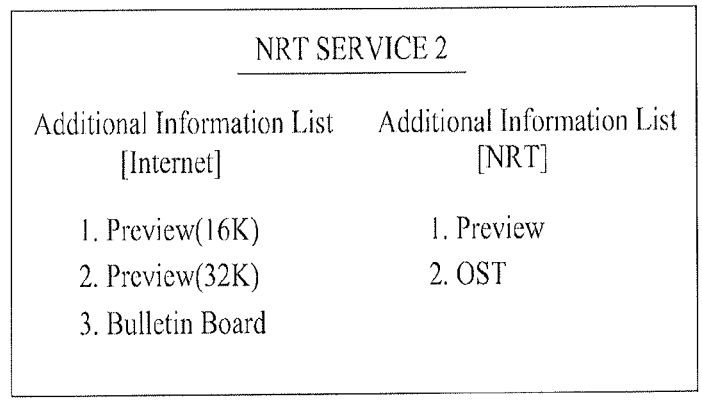
(c)

FIG. 21
| SERVICE GUIDE |||||
|---|---|---|---|---|
| 11/30 | 6 : 00 | 7 : 00 | | 8 : 00 |
| KBS | | NRT Service 1 | | |
| MBC | NRT Service 2 | | NRT Service 3 ||
| SBS | NRT Service 4 | | | |
(a)
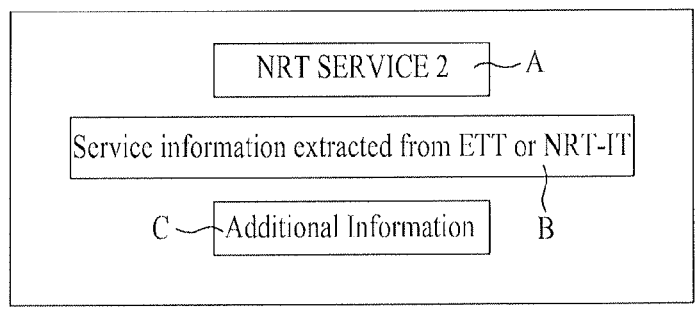
(b)
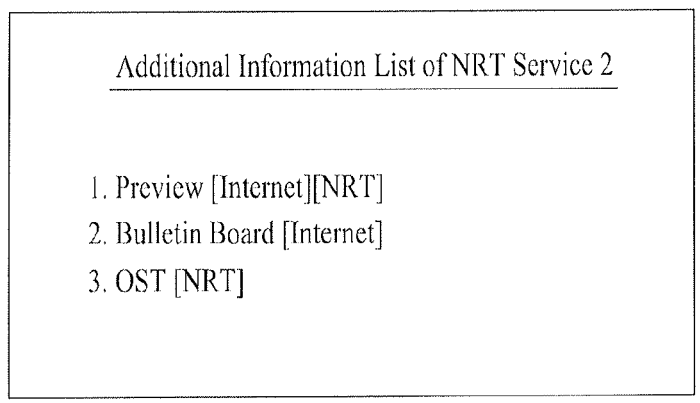
(c)

FIG. 22

| Syntax | No.of Bits | Format |
|---|---|---|
| NRT_content_related_material_descriptor ( ) { | | |
|     descriptor_tag | 8 | 0xTBD |
|     descriptor_length | 8 | uimsbf |
|     URI_count | 8 | uimsbf |
|     for(i=0; i<URI_count;i++){ | | |
|         URI_type | 4 | uimsbf |
|         URI_access_type | 4 | uimsbf |
|         Related_Type | 8 | uimsbf |
|         RM_service_id | 16 | uimsbf |
|         RM_content_id | 32 | uimsbf |
|         Recommended_speed | 8 | uimsbf |
|         RM_file_URI_length | 8 | uimsbf |
|         RM_file_URI | var | |
|     } | | |

FIG. 23

| Syntax | No.of Bits | Format |
|---|---|---|
| Content_additional_information_descriptor() { | | |
|    descriptor_tag | 8 | 0xTBD |
|    descriptor_length | 8 | uimsbf |
|    aspect_ratio | 4 | uimsbf |
|    resolution | 4 | uimsbf |
|    series_name_length | 8 | uimsbf |
|    series_name_text() | var | |
|    num_of_related_content | 8 | uimsbf |
|    for(i=0;i<num_of_related_content;i++) { | | |
|       content_linkage | 32 | uimsbf |
|       content_name_length | 8 | uimsbf |
|       content_name_text() | var | |
|       start_time | 32 | uimsbf |
|    } | | |
| } | | |

FIG. 24

| Syntax | No.of Bits | Format |
|---|---|---|
| NRT_event_related_material_descriptor ( ) { | | |
|     descriptor_tag | 8 | 0xTBD |
|     descriptor_length | 8 | uimsbf |
|     URI_count | 8 | uimsbf |
|     for(i=0; i<URI_count;i++){ | | |
|         URI_type | 4 | uimsbf |
|         URI_access_type | 4 | uimsbf |
|         Related_Type | 8 | uimsbf |
|         RM_service_id | 16 | uimsbf |
|         RM_event_id | 14 | uimsbf |
|         Recommended_speed | 8 | uimsbf |
|         RM_file_URI_length | 8 | uimsbf |
|         RM_file_URI | var | |
|     } | | |

METHOD OF PROCESSING NON-REAL TIME SERVICE AND BROADCAST RECEIVER

This application is a continuation of U.S. application Ser. No. 13/410,918, filed Mar. 2, 2012, now U.S. Pat. No. 8,504,714, which is a continuation of U.S. application Ser. No. 12/654,077, filed Dec. 9, 2009, now U.S. Pat. No. 8,156,237, and claims the benefit of U.S. Provisional Application No. 61/121,178, filed on Dec. 9, 2008; 61/121,181 filed on Dec. 9, 2008; 61/138,494 filed on Dec. 17, 2008; 61/153,973 filed on Feb. 20, 2009; 61/153,985 filed on Feb. 20, 2009; 61/160,689 filed on Mar. 16, 2009 and 61/226,259 filed on Jul. 16, 2009, which are hereby incorporated by reference.

BACKGROUND OF THE INVENTION

The Field

The present disclosure relates to a method for processing non-real time service and broadcast receiver thereof.

Description of the Related Art

A digital television (DTV) can not only provide video and audio services which are conventional TV services, but can now also provide various other services. For example, the DTV can provide an Electronic Program Guide (EPG) or the like to the user and can simultaneously provide broadcast services received through two or more channels. Especially, the number of services that a reception system can provide has been significantly increased since the reception system has been equipped with a large-capacity storage device and has been connected to the Internet or data communication channels which enable bidirectional communication.

SUMMARY OF THE INVENTION

An object of the present invention is to provide a method of receiving a non-real time service and a broadcast receiver thereof.

Another object of the present invention is to provide a method of receiving access information of broadcast signaling information associated with additional information relating to a non-real time service and the broadcast receiver thereof.

Another object of the present invention is to provide a method of processing the additional information related to a non-real time service based on the access information of the broadcast signaling information and the broadcast receiver thereof.

Another object of the present invention is to provide a method of receiving access information of the additional information of the content of the broadcast signaling information and the broadcast receiver thereof.

Another object of the present invention is to provide a method of processing the additional information of the content based on the access information of the broadcast signaling information and the broadcast receiver thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the above objectives according to an embodiment of the present invention to process a non-real time service of a broadcast receiver, the steps may include receiving and processing a signaling information table including access information of the non-real time service, storing data of the non-real time service based on the signaling information table, extracting access information of additional information of the non-real time service from the signaling information table, and downloading the additional information of the non-real time service based on the extracted access information.

The additional information related to the non-real time (NRT) service is downloaded through at least an internet and a FLUTE session.

The additional information related to the NRT service is downloaded in a file format.

The access information is a Uniform Resource Identifier (URI) value identifying the file of the additional information related to the NRT service.

If the file of the additional information of the NRT service is provided through the internet, the access information includes the address of the website.

If the file of the additional information of the NRT service is provided through the FLUTE session, the access information includes the content location information of the corresponding file of a FDT within the FLUTE session.

According to an embodiment of the present invention, the broadcast receiver may include first processing unit, second processing unit, and NRT service manager. The first processing unit receives signaling information table including information of the access information of the non-real time service and processes it. The second processing unit receives the data of the non-real time service based on the signaling information table in non-real time and stores it. The NRT service manager extracts the access information of the non-real time service from the signaling information table and downloads the additional information of the non-real time service based on the extracted access information.

Other objects, features, and advantages of the present invention will be apparent through a detailed description of the embodiments with reference to the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an embodiment of a bit stream syntax structure of a virtual channel table according to the present invention;

FIG. 5 illustrates an embodiment of service type field values in the virtual channel table of FIG. 4 and respective meanings of the values;

FIG. 6 illustrates another embodiment of values allocated to a service type field in the virtual channel table of FIG. 4 and respective meanings of the values;

FIG. 7 illustrates an embodiment of a bit stream syntax structure of a data service table (DST) of the present invention;

FIG. 10 and FIG. 11 illustrate a bit stream syntax structure of a Non-Real Time Service Table (NST) according to the present invention;

FIG. 12 illustrates a bit stream syntax structure of a component_descriptor( ) according to an embodiment of the present invention;

FIG. 13 illustrates a bit stream syntax of FLUTE file delivery data using the component_descriptor( );

FIG. 14 and FIG. 15 illustrate a bit stream syntax structure of a Non-Real Time Information Table (NRT-IT) according to an embodiment of the present invention;

FIG. 16 illustrates a bit stream syntax of a material descriptor related to an NRT service according to an embodiment of the present invention;

FIG. 17 illustrates an example of the value allocated with the URI_type field and the meaning of the value according to the present invention;

FIG. 18 illustrates an example of the value allocated with the URI_access_type field and the meaning of the value according to the present invention;

FIG. 19 illustrates an example of the value allocated with the Related_type field and the meaning of the value according to the present invention;

FIGS. 20(a) through 20(c) illustrate an example of the UI screen displayed by the broadcast receiver when NRT service related material descriptor included in the NST is received;

FIGS. 21(a) through 21(c) illustrate another example of the UI screen displayed by the broadcast receiver when NRT service related material descriptor included in the NST is received;

FIG. 22 illustrates a bit stream syntax structure of a material descriptor related to the NRT content according to an embodiment of the present invention;

FIG. 23 illustrates a bit stream syntax structure of a descriptor of the additional content information according to an embodiment of the present invention;

FIG. 24 illustrates a bit stream syntax structure of a material descriptor related to event according to an embodiment of the present invention.

DETAILED DESCRIPTION OF THE INVENTION

Figure 1:
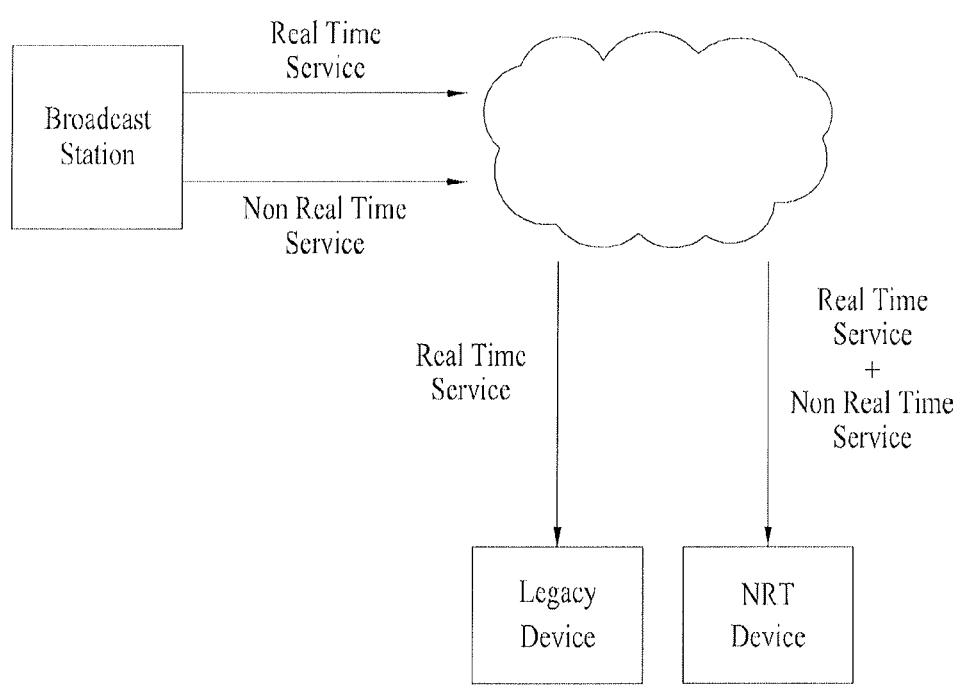
FIG. 1 illustrates a conceptual diagram of providing a real-time (RT) service and a non-real time (NRT) service.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The term real time (RT) service used in the present invention actually means the real-time service. In other words, it is restricted in time. On the other hand, non-real time (NRT) service refers to non-real time, not RT service. Thus, NRT service is not restricted in time. Further the data used in NRT service is referred to as NRT service data.

A broadcast receiver according to the present invention receives NRT service through terrestrial, cable, internet, and the like.

The NRT service is stored in the broadcast receiver and then it is displayed through a display according to a time specified by the user or at the user's request. The NRT service is received and stored in a file format according to an embodiment. In an embodiment, the storage is an internal HDD attached to the inner part of the broadcast receiver. In another embodiment, the storage may be Universal Serial Bus (USB) memory or an external HDD connected externally with the broadcast receiving system.

In order to receive and store the files configuring the NRT service and provide service to the user, signaling information is needed. The signaling information is referred to NRT service signaling information or NRT service signaling data according to the present invention.

According to the method of receiving IP datagram, NRT service can be divided into Fixed NRT service and Mobile NRT service. More specifically, the Fixed NRT service is provided through a fixed broadcast receiver, and Mobile NRT service is provided through a mobile broadcast receiver.

According to an embodiment of the present invention, Fixed NRT service is explained in detail. However, the present invention can also be obviously applied to a Mobile NRT service as well.

FIG. 1 illustrates a conceptual diagram of how a RT and an NRT service are provided.

The broadcast station, following the conventional method, transmits the current terrestrial broadcast (or mobile broadcast) RT service. At this juncture, the broadcast station may provide NRT service using the extra bandwidth or a specific bandwidth left after sending the RT service. Thus, RT service and NRT service are transmitted through a same or a different channel. herefore, a broadcast receiver can be divided into RT service and NRT service, and in order to provide the user with the NRT service when needed, NRT service signaling information (or NRT service signaling data) is required. The NRT service signaling information (or NRT service signaling data) will be described below in detail.

For example, a broadcast station can transmit broadcast service data in real time and transmit news clips, weather information, advertisements, push VOD, or the like in non-real time. The NRT service may not only provide such news clips, weather information, advertisements, and push VOD, but may also provide specific clips and detailed information on specific program from a real-time broadcast service.

A conventional broadcast receiver (i.e., a legacy device) can receive and process RT services but cannot receive and process NRT services. Thus, it is a principle that the process of the conventional broadcast receiver (i.e., a legacy device) is not affected by NRT stream included in the transmission of RT service. In other words, the conventional broadcast receiver does not have a method of handling the NRT service even if it is received.

However, the broadcast receiver (i.e., an NRT device) according to an embodiment of the present invention can combine NRT services and RT services to provide a variety of services to the user compared to the convention receiver.

Figure 2:
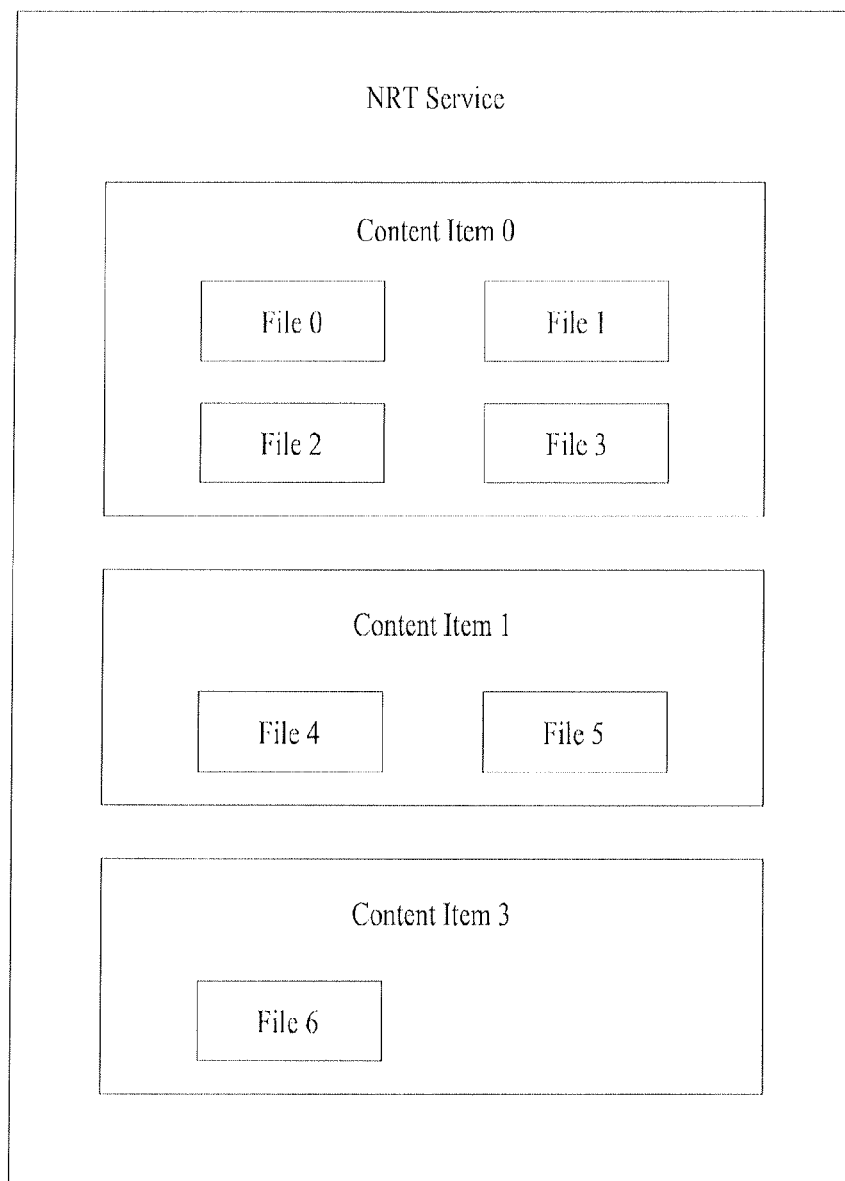
FIG. 2 is a diagram illustrating the relationship between an NRT service, content items, and files.

In an embodiment, one NRT service according to the present invention includes one or more content item (or content or NRT content) and one content includes one or more files as shown in FIG. 2. The terms "file" and "object" have the same meaning in the description of the present invention.

The content item is the minimum unit that can be presented independently. For example, when a news program, which includes an economic news section, a political news section, and a life news section, is provided in non-real time, the news program may be an NRT service and each of the economic news section, the political news section, and the life news section may be the content item. And each of the economic news section, the political news section, and the life news section may include at least one file.

The NRT service can be transmitted in an MPEG-2 Transport Stream (TS) packet format through a dedicated broadcast channel or the same broadcast channel as the RT service. In this case, a unique PID is transmitted after being allocated to a TS packet of the NRT service data in order to identify the NRT service. In an embodiment of the present invention, IP-based NRT service data is packetized into an MPEG-2 TS packet for transmission.

The NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet for transmission. The NRT service signaling data transmitted through an NRT service signaling channel includes NRT Service Map Table (NST) and NRT Information Table (NRT-IT). In an embodiment, the NST provides the access information of at least one NRT service and at least one content item/file that forms NRT services that operate in the IP layer. In one embodiment, NRT-IT provides detailed information of the content item/file that forms NRT service. In the present invention, the NST and the NRT-IT may be referred to as signaling information table.

Figure 3:
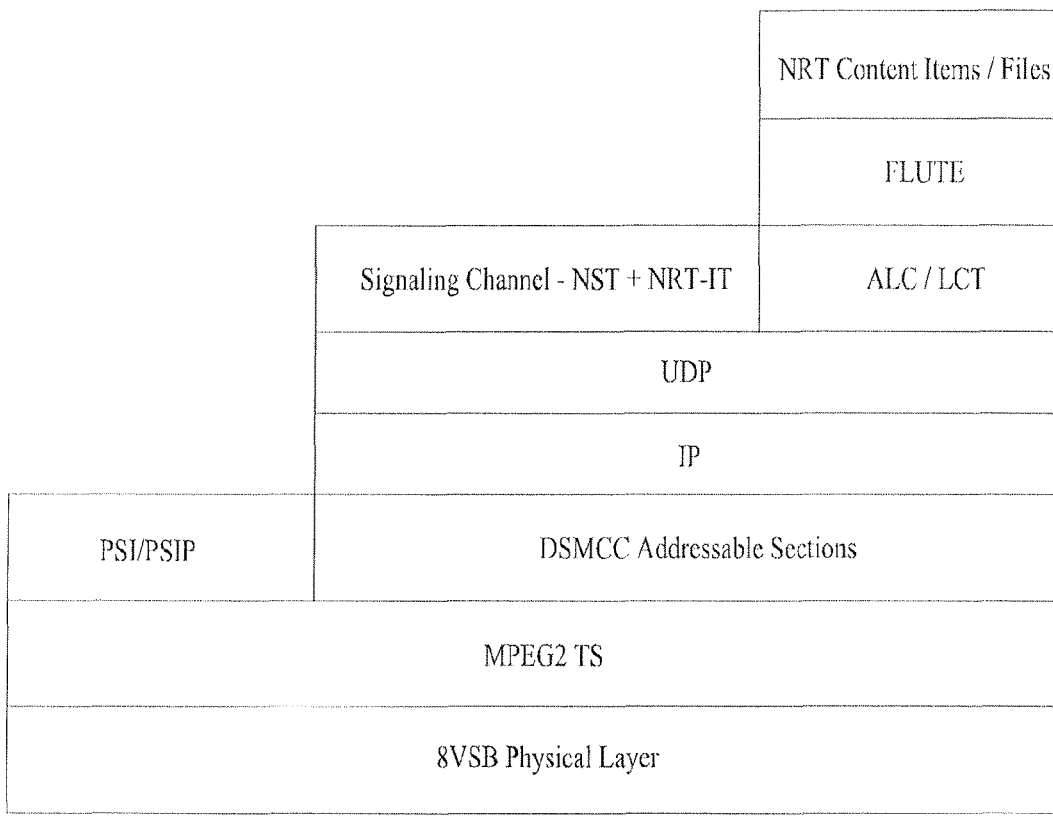
FIG. 3 illustrates an embodiment of a protocol stack for a fixed NRT service according to the present invention.

FIG. 3 illustrates a diagram for a protocol stack of an NRT service configured according to an embodiment of the present invention.

In an embodiment of the present invention, for fixed NRT service, the file-type NRT service is packetized according to an IP scheme in the IP layer and then transmitted through a specific virtual channel in an MPEG-2 TS format.

In an embodiment of the present invention, as an example of the MPEG-2 based Program Specific Information/Program and System Information Protocol (PSI/PSIP) table, the presence of the NRT service or the identification information of the NRT service may be signaled through the virtual channel in the Virtual Channel Table (VCT).

In an embodiment of the present invention, the NRT service signaling channel that transmits NRT service signaling data which signals the access information of the IP based NRT service is transmitted in an MPEG-2 TS format after being packetized according to an IP stream in the IP layer through a specific virtual channel.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 3. The packetized ALC/LCT data is again packetized according to a UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation.

In addition, NRT service signaling data required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, multicast of the NRT service signaling channel is achieved after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. So, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section." A 188-byte MPEG-2 TS packet can be created by dividing the addressable section data into 184-byte units and adding a 4-byte MPEG header to each 184-byte unit. At this time, a value allocated to a PID of the MPEG header is a unique value that can identify TS packets that carry the NRT service signaling channel and the NRT service.

Program Specific Information (PSI) and Program and System Information Protocol (PSIP) table section data is also packetized into MPEG-2 TS.

An embodiment of the PSI table may include a Program Map Table (PMT), a Program Association Table (PAT), or the like, and an embodiment of the PSIP table may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MPEG-2 TS packets are modulated according to a predetermined transmission scheme, for example, a VSB transmission scheme, in a physical layer and are then transmitted to the reception system.

In an embodiment of the present invention, the transmission of an NRT service is determined by signaling through a PSI/PSIP table. For example, whether or not an NRT service is transmitted is signaled in a Virtual Channel Table (VCT).

FIG. 4 illustrates a syntax structure of the Virtual Channel Table (VCT) section according to an embodiment.

The VCT section, taking information about the virtual channel for example, transmits information of channel information for channel selection and PID information for receiving audio and/or video. Thus, when the VCT section is parsed, the PID of the audio and video of the broadcast program transmitted within the channel along with the channel number and channel name is known.

The VCT section syntax includes at least one of table_id field, section_syntax_indicator field, private_indicator field, section_length field, transport_stream_id field, version_number field, current_next_indicator field, section_number field, last_section_number field, protocol_version field, and num_channels_in_section field.

The VCT section syntax further includes first 'for' loop (virtual channel loop) which repeats for the number indicated in the num_channels_in_section field value, the first loop includes at least one of short_name field, major_channel_number field, minor_channel_number field, modulation_mode field, carrier_frequency field, channel_TSID field, program_number field, ETM_location field, access_controlled field, hidden field, service_type field, source_id field, descriptor_length field, and second 'for' loop which repeats for the number of the descriptors included in the first loop. For the convenience of explanation in the present invention, the second loop is referred to as the first descriptor loop. The descriptor( ) included in the first descriptor loop is a descriptor applied in each virtual channel.

The VCT section syntax may further include a third 'for' loop which repeats for the number of value indicated by additional_descriptor_length field and the number of descriptor added in the VCT section. For the convenience of explanation in the present invention, the third loop is referred to as the second descriptor loop. The additional_descriptors( ) included in the second descriptor loop is applied to all the descriptors described in the virtual channel of the VCT section.

The table_id field illustrated in FIG. 4, indicates a unique identifier or identification (ID) which identifies that the information transmitted through the table is VCT. More specifically, the table_id field indicates a value informing that the table corresponding to this section is a VCT. For example, a 0xC8 value may be given to the table_id field.

The version_number field indicates the version number of the VCT, the section_number field indicates the number of this section, and the last_section_number field indicates the number of the last section of a complete VCT. The num_channels_in_section field designates the number of the overall virtual channel existing within the VCT section.

The short_name field in the first 'for' loop indicates the name of a virtual channel. The major_channel_number field indicates a 'major' channel number associated with the virtual channel defined within the first loop and the minor_channel_number field indicates 'minor' channel number. Thus, each channel number should be connected to the major and minor channel numbers, and the major and minor channel numbers are used as user reference numbers for the corresponding virtual channel.

The program_number field is shown for connecting the virtual channel having an MPEG-2 program association table (PAT) and program map table (PMT), and matches the program number within the PAT/PMT. Here, the PAT describes the elements of a program corresponding to each program number, and the PAT indicates the PID of a transport packet transmitting the PMT. The PMT describes the affiliated information and the PID list of the transport packet in which the identification number and the audio/video information of a program is transmitted in bit sequence.

The service_type field indicates the service type within the corresponding virtual channel.

In an embodiment, the virtual channel may include at least one RT service and at least one NRT service including audio and/or video.

In this case, service type values may be allocated as shown in FIG. 5 and a value of 0x04 representing an ATSC-data-only service may be used to indicate that an NRT service is provided through the virtual channel.

In another embodiment, the virtual channel may only include one or more NRT service. In such a case, as shown in FIG. 6, a new service_type field value of 0x08 may be defined to indicate that an NRT service is provided through the virtual channel.

The source_id field indicates a program source connected to the corresponding virtual channel.

The term "source" refers to a specific source such as a video, text, data or audio source. The source_id field has a unique value in a transport stream in which a VCT is transmitted.

On the other hand, data service table (DST) may be received through PID included in the service_location_descriptor of the VCT, and through the DST, the types of the application and the detailed information of the data broadcast stream transmitted through the channel is known.

In the present invention, NRT application (NRT service) is identified through the DST.

FIG. 7 illustrates the DST section syntax structure according to an embodiment.

A sdf_protocol_version field (8-bit) indicates the version of the Service Description Framework protocol.

An application_count_in_section field (8-bit) indicates the number of applications listed within the DST section.

A compatibility_descriptor( ) field indicates that the corresponding structure includes DSM-CC compatible descriptor. The object is to signal the compatibility requests of the application of the platform received to determine the ability to use the corresponding data service.

An app_id_byte_length field (16-bit) indicates the number of bytes used to identify the application.

An app_id_description field (16-bit) indicates the format and the semantics of the next application identification bytes. As described in the table 1 below, '0x0003' is newly assigned to identify that the corresponding application is an NRT application. The assigned value of '0x0003' is just an exemplary value and the scope of this application is not limited to the value.

TABLE 1

| Value | Application Identifier Format |
|---|---|
| 0x0000 | DASE application |
| 0x0001 | ATSC reserved |
| 0x0002 | ATSCA/92 Application |
| 0x0003 | NRT Application |
| 0x0004-0x7FFF | ATSC reserved |
| 0x8000-0xFFFF | User private |

An app_id_byte field (8-bit) describes the application identifier in bytes.

A tap_count field (8-bit) indicates the number of Tap( ) structure used by the corresponding application.

A protocol_encapsulation field (8-bit) indicates the type of the protocol encapsulation used to transmit the specific data element in reference with the Tap( ) field.

An action_type field (7-bit) instructs the character of the data in reference with the Tap( ) field.

A resource_location field (1-bit) indicates the location of the association_tag field that matches the association_tag value listed within the next Tap structure. If the value of the corresponding field is '0,' then the matching association_tag exist in the PMT of the current MPEG-2 program. Oppositely, if the value is '1,' then the matching association_tag exists in the DSM-CC Resource Descriptor in the Network Resources Table of the corresponding data service.

A Tap( ) field, for example, is defined in a unique structure including the following. The tap_id field (16-bit) is used by the application to identify the data elements. The range of the value of tap_id is determined by the app_id_byte fields related to Tap( ) within the DST. The value of tap_id is selected by the data service provider. Further, it is used in application to handle the data elements.

A Use field (16-bit) is used to specify the communication channel referenced by the association_tag.

An association_tag field (16-bit) uniquely identifies one from the listed DSM-CC resource descriptor within the Network Resource Table or listed data elementary stream within the PMT.

A Selector( ) field indicates a unique data element that can be used in the communication channel referenced by association_tag field or in the data elementary stream. Further, the selector structure may set the protocol needed for the corresponding data element.

A tap_info_length field (16-bit) indicates the number of bytes of the descriptors of the next field of the corresponding field.

A descriptor( ) field follows the descriptor format.

An app_info_length field (8-bit) indicates number of bytes of the descriptor of the next corresponding field.

A descriptor( ) field follows the descriptor format.

An app_data_length field (16-bit) indicates length of the app_data_byte fields in bytes.

An app_data_byte (8-bit) describes the private data fields different from input parameters associated with the application as 1 byte.

A service_info_length field (8-bit) indicates number of byte unit of the next descriptors.

A descriptor( ) field follows the descriptor format.

A service_private_data_length field (16-bit) indicates length of byte unit of the private fields.

A service_private_data_byte field (8-bit) describes the private fields as 1 byte.

Figure 8:
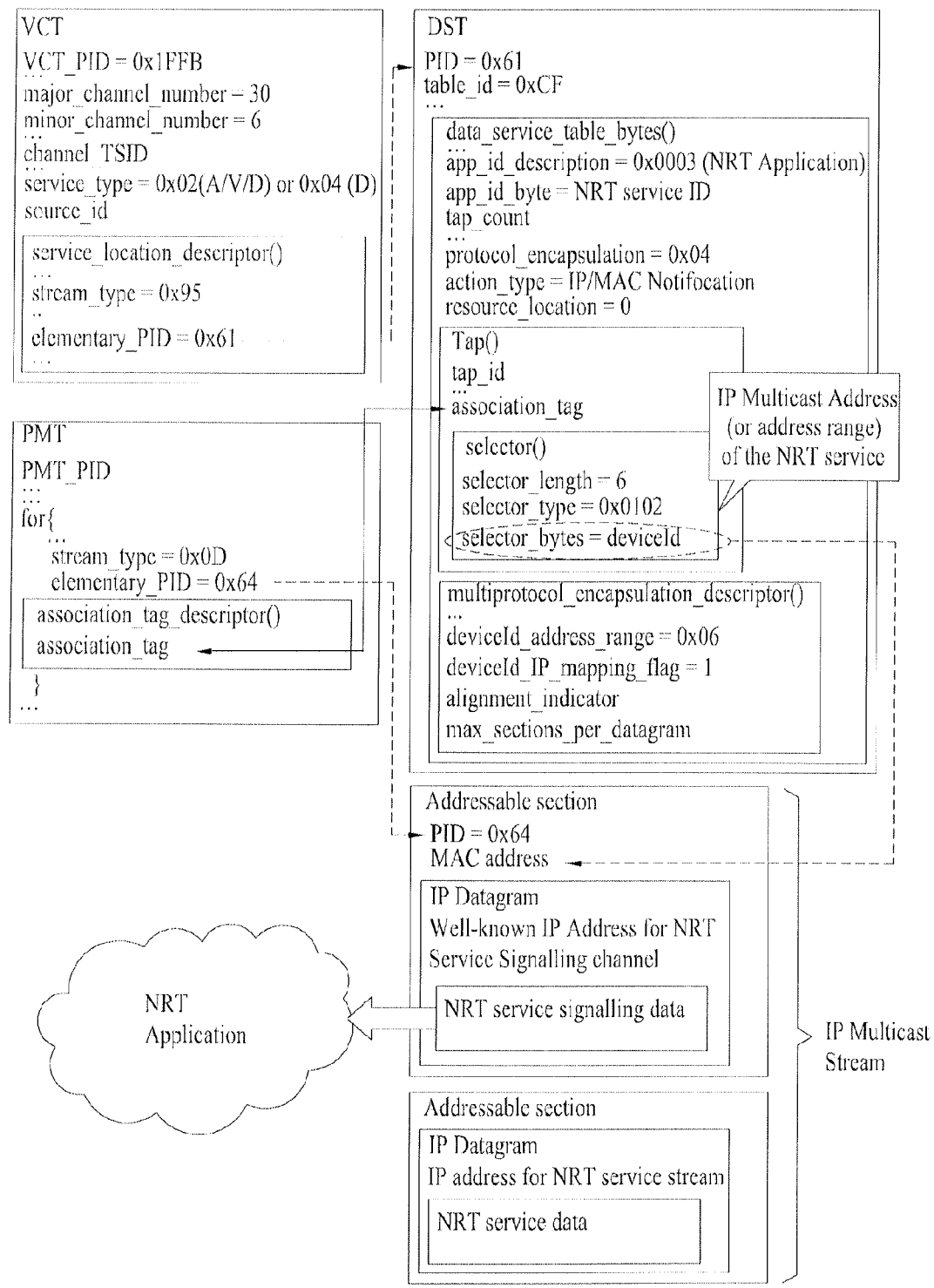
FIG. 8 illustrates an embodiment of a procedure for obtaining access information of an IP stream that carries an NRT service signaling channel using a PSI/PSIP table according to the present invention.

FIG. 8 illustrates a method in which an NRT service is received and provided using an ATSC A/90 standard for carrying (or transmitting) a data broadcast stream and an ATSC A/92 standard for transmitting an IP multicast stream in a broadcast receiver according to the present invention.

Namely, information of a stream that constitutes each virtual channel is signaled in an ES_loop of a PMT or a service location descriptor of a VCT. For example, an NRT service stream can be transmitted through the virtual channel in the case where the service type of the VCT is 0x02 (i.e., digital A/V Data), 0x04 (i.e., data only), or 0x08 (i.e., NRT only service), as shown in FIG. 5 or FIG. 6. At this time, when the stream_type field included in the service location descriptor (or the ES loop of the PMT) has a value allocated 0x95 (i.e., DST transmission), this indicates that a data broadcast is transmitted. A normal A/V is transmitted if the service location descriptor has no value for stream_type field or does not have a value of 0x95 allocated. Therefore, if the stream_type field included in the service location descriptor has a value of 0x95, the Elementary_PID field value is a PID of a Data Service Table (DST). Thus, the DST can be received through the Elementary_PID field.

The type of the application and details of a data broadcast stream transmitted through this channel can be determined through the DST. In the present invention, an NRT application (i.e., an NRT service) is identified using the DST.

That is, an App_id_description field of the DST specifies the format and analysis of application identification bytes subsequent to this field. In an embodiment of the present invention, '0x0003' is allocated to the App_id_description field in order to identify the NRT application. The illustrated value (number) is only an example and does not limit the scope of the present invention.

If the App_id_description field value is '0x0003', an Application_id_byte value subsequent to this field is a service ID of the NRT application. A service ID of the NRT application may have a URI value that globally and uniquely identifies the corresponding service.

After the NRT application is identified as described above, a PID of an MPEG-2 TS packet separated from the IP datagram of the NRT service signaling channel is located through the Tap information. Then, an IP datagram that carries the NRT service signaling channel can be obtained from MPEG-2 TS packets having the PID found through the tap information and NRT service signaling data can be obtained from the obtained IP datagram. Here, well-known IP access information, i.e., a well-known IP address and a well-known UDP port number can be used as the IP access information of the NRT service signaling channel.

That is, an asynchronous IP stream is transmitted if a Protocol_encapsulation field value in the DST is 0x04 and a device_id value indicating the destination address is transmitted through a selector_bytes value if a Selector_type field value is 0x0102. A multiprotocol_encapsulation_descriptor is used in order to accurately analyze the selector_bytes value and signals the number of valid bytes included in the device_id value. As a result, an IP multicast address (or address range) of the NRT service signaling channel transmitted through the PID can be determined through the Tap information.

Accordingly, the IP multicast address (or address range) is accessed and an IP stream, i.e., an IP packet, is received and NRT service signaling data is extracted from the received IP packet.

NRT service data, i.e., NRT content/files, is received based on the extracted NRT service signaling data and the received data can be stored in a storage medium or can be displayed on a display.

In another embodiment of the present invention, the NRT service can be signaled using a new value, for example, 0x96 instead of 0x95 as the stream type field value of the DST. This embodiment aims to eliminate the risk that the conventional receiver may malfunction with the NRT service which is a new application, in the case where the conventional receiver operates by determining whether or not a data broadcast stream is present based only on whether or not a stream having a stream type value of 0x95 is present. In this case, if a new stream type is defined, it will be possible to allow the conventional receiver to ignore this stream type, thereby guaranteeing backward compatibility.

Figure 9:
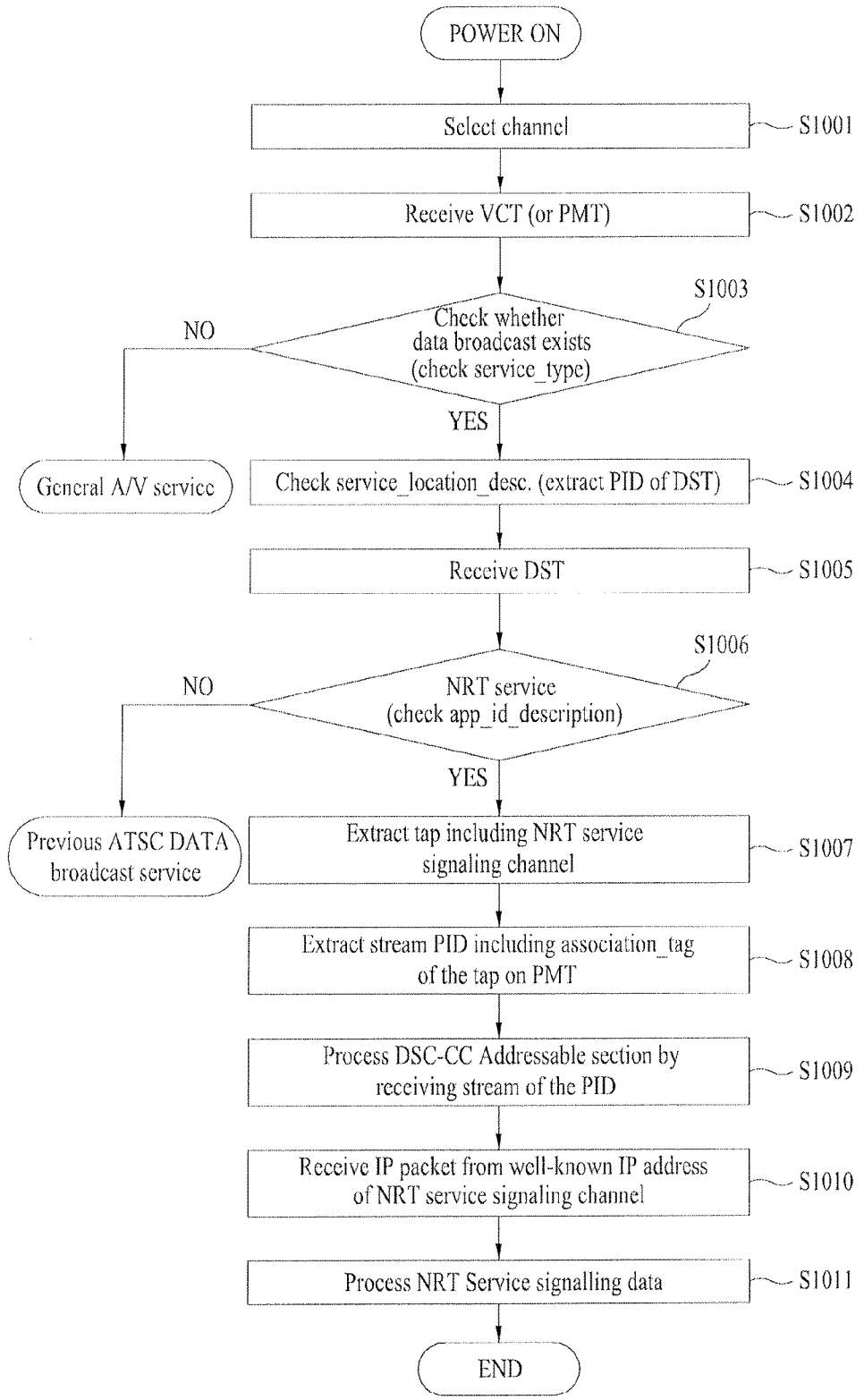
FIG. 9 is a flowchart illustrating a procedure for obtaining access information of an IP stream that carries an NRT service signaling channel using a PSI/PSIP table according to an embodiment of the present invention.

FIG. 9 is a flowchart illustrating the process of NRT service signaling data and the process of extracting the NRT service data.

In an embodiment, as shown in FIG. 9, the service_type field in the VCT has a value of 0x08 as in FIG. 6, indicating that at least one NRT service is transmitted through the relevant virtual channel.

After a power of a receiver has been turned on, if a default channel or a channel by a user is selected [S1001], the receiver receives a VCT or a PMT [S1002]. And then the receiver determines whether NRT service exists or not by parsing the VCT [S1003]. This can be done through looking at the service_type in the received virtual channel loop within the VCT. The [S1001] step is processed in the tuner and the [S1002]/[S1003] step is processed in the PSI/PSIP section handler.

For instance, if a value of the service_type is not set to '0x08', the relevant virtual channel will not transmit NRT service. The virtual channel will then transmit conventional service (i.e., legacy ATSC service), the receiver processes according to the information included in the virtual channel.

If the service_type field has a value of 0x08, the virtual channel will transmit NRT service. In such a case, service location descriptor in the virtual channel of the VCT is parsed to extract the PID of DST [S1004]. Then, using the extracted PID, DST is received [S1005]. The [S1004] and [S1005] step is processed through the demultiplexer controlled by the service manager.

It is then determined whether the corresponding service provided on the selected channel is an NRT service from the received DST [S1006].

The determination of a presence of the NRT service can be performed by checking the value of the App_id_description field.

For instance, the value of the App_id_description is set to '0x0003,' in this present invention to identify that the service is an NRT application (i.e., NRT service). The value (number) is only an example and will not limit the scope of the present invention.

If the value of the App_id_description field is '0x0003,' the value of the subsequent Application_id_byte becomes the value of service ID of the NRT application (i.e., NRT service). As a result of identifying the NRT application, a Tap is extracted to locate the PID of the MPEG-2 TS packet separated from the IP datagram of the NRT service signaling channel [S1007]. And, stream PID including association_tag of the Tap is extracted from the PMT [S1008]. The steps of [S1006] to [S1008] are processed by the service manager or the PSI/PSIP section handler.

After receiving and decapsulating the MPEG-2 TS packets corresponding to the stream PID, i.e., removing the MPEG-2 header, a DSM-CC addressable section is recovered [S1009]. This process is handled by the addressable section handler.

Subsequently, after removing section header and CRC checksum from the DSM-CC addressable section, IP datagram transmitting the NRT service signaling channel is recovered [S1010], and the NRT service signaling data is obtained from the recovered IP datagram [S1011]. At this time, the access information of the IP datagram transmitting the NRT service signaling channel is received from a well-known destination IP address and well-known destination UDP port number.

If a value of Protocol_encapsulation in the DST is set to '0x04', an asynchronous IP datagram is transferred. If Selector_type is set to '0x0102', a value of device_id indicating a destination address is delivered via selector_bytes. In order to accurately analyze the value of the selector_bytes, multiprotocol_encapsulation_descriptor is used and the number of the valid byte within the device_id is signaled. As a result, the IP Multicast address (or address range) of the NRT service signaling channel transmitted through PID of the Tap information is known.

Thus, by accessing the IP Multicast address (or address range), IP stream, i.e., IP packet is received, and the NRT service signaling data is extracted from the IP packet.

Based on the extracted NRT service signaling data, NRT service data, i.e., NRT content item/files can be received and stored in a storage unit or can be displayed through a display.

In an embodiment, the NRT service signaling data transmitted through the NRT service signaling channel may include NRT Service Map Table (or Service Table: NST) and NRT Information Table (NRT-IT).

In an embodiment, IP datagrams of the NST and NRT-IT has the same well-known IP address and well-known UDP port number. Therefore, the determination of NST and NRT-IT included in the NRT service signaling data is done through table identifier. Thus, the table identifier can be the table_id of the corresponding table or the header of the table section, and when necessary, table_id_extension can be referred to in order to identify the table.

The NST provides access information of NRT services. In an embodiment, the NST has a similar table form to MPEG-2 private section form.

The NST provides access information of IP based NRT services included in the virtual channel. For example, the NST provides access information of each FLUTE sessions that configures one NRT service.

Here, whether one NST is configured with one session or plurality of sessions is determined through the table_id field, section_number field, last_section_number field, and the like. And the table may be completed by removing the IP header and the UDP header of the IP datagrams of the NRT service signaling channel and gathering sections having the same table identifier. For example, by gathering the sections having table identifier allocated for NST, the NST is completed.

FIG. 10 and FIG. 11 illustrate a bit stream syntax structure of an NST section according to an embodiment of the present invention. The detail of each field of the NST section is explained in the following.

Although the syntax is written in an MPEG-2 private section format for better understanding, the data may be in any format. For example, it is possible to use another method in which the syntax is expressed in a Session Description Protocol (SDP) format and is then signaled through a Session Announcement Protocol (SAP).

In FIG. 10 and FIG. 11, a table_id field includes an 8-bit unsigned integer number that indicates the type of table section being defined in NRT Service Table (NST).

A section_syntax_indicator is a 1-bit field that shall be set to '0' to always indicate that this table is derived from the "short" form of the MPEG-2 private section table.

A private_indicator (1-bit) indicates whether the type of the corresponding section follows the private section type or not. (This field that shall be set to '1')

A section_length is a 12-bit field. It specifies the number of remaining bytes this table section immediately following this field. The value in this field shall not exceed 4093 (0xFFD).

A table_id_extension field is a 16-bit field and is table-dependent. It shall be considered to be logically part of the table_id field providing the scope for the remaining fields. The table_id_extension field includes NST_protocol_version fields.

The NST_protocol_version field is an 8-bit unsigned integer field whose function is to allow, in the future, this NST to carry parameters that may be structured differently than those defined in the current protocol. At present, the value for the NST_protocol_version shall be zero. Non-zero values of NST_protocol_version may be used by a future version of this standard to indicate structurally different tables.

A version_number field (5-bit) indicates the version number of the NST.

A current_next_indicator field is a one-bit indicator, which when se to '1' shall indicate that the NST sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number is an 8-bit field that shall give the section number of this NST section. The section_number of the first section in an NST shall be '0x00'. The section_number shall be incremented by 1 with each additional section in the NST.

A last_section_number is an 8-bit field that shall give the number of the last section (i.e., the section with the highest section_number) of the NST of which this section is a part).

A num_NRT_services field is an 8-bit field that specifies the number of services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_id is a 16-bit unsigned integer number that shall uniquely identify this NRT service within the scope of this NRT section. The NRT_service_id of a service shall not change throughout the life of the service. To avoid confusion, it is recommended that if a service is terminated, then the NRT_service_id for the service should not be used for another service until after a suitable interval of time has elapsed.

An NRT_service_status is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator is a 1-bit field that indicates when set to 1, service protection is applied to at least one of the components needed to provide a meaningful presentation of this NRT Service.

A Short_NRT_service_name_length field (3-bit) indicates the number of byte pairs within the Short_NRT_service_name field.

A Short_NRT_service_name filed (16*m bit) indicates a short name of the NRT service. This field may be filled with null data (for example, 0x00) when the NRT service has no short name.

An NRT_service_category field is a 6-bit enumerated type field that shall identify the type of service carried in this NRT.

A num_components field is a 5-bit field that specifies that number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of '1' for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a 1-bit Boolean flag that indicates, when set to '1', that an NRT_service_destination_IP_address value is present, to serve as the default IP address for the components of this NRT Service.

A source_IP_address is a 32 or a 128 bit field that shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address is a 32 or a 128 bit field that shall be present if the NRT_service_destination_IP_address_flag is set to '1' and shall not be present if the NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

A 'for' loop, which will also be referred to as a "component loop," is executed as much as the number of times as the number of components corresponding to the num_components field value to provide access information of a plurality of components. This provides access information of each component included in the NRT service. Here, the following field information may be provided for each component. In an embodiment, one component corresponds to one FLUTE session.

An essential_component_indicator field is a one-bit indicator which, when set to '1', shall indicate that this component is an essential component for the NRT Service. Otherwise, this field indicates that this component is an optional component.

A port_num_count is a 6-bit field that shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field (32 or 128 bit) shall be present if the component_destination_IP_address_flag is set to '1' and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_sercie_destination_IP_address field. The conditional use of the 128 bit-long address version of this field is to facilitate possible use of IPv6 in the future, although use of IPv6 is not currently defined.

A component_destination_UDP_port_num is a 16-bit unsigned integer field that represents the destination UDP port number for this UDP/IP stream component.

A num_component_level_descriptors field (4-bit) indicates the number of descriptors providing the additional information of the component level.

The same number of the component_level_descriptor( ) is included in the component loop providing additional information as the number of the field value of the num_component_level_descriptors.

A num_NRT_service_level_descriptors field (4-bit) indicates the number of descriptors that provide additional information about the NRT service level.

The same number of the NRT_service_level_descriptor( ) are included in NRT service loop as the number of the field value of num_NRT_service_level_descriptors to provide additional information about the NRT service.

A num_virtual_channel_level_descriptors field (4-bit) indicates the number of descriptors which provides additional information about the virtual channel level.

The same number of virtual_channel_level_descriptor( ) included in the virtual channel loop as the number of the field value of the num_virtual_channel_level_descriptors to provide additional information of the virtual channel.

FIG. 12 illustrates an embodiment of a bitstream syntax structure of a component_level_descriptors( ). The component_descriptor( ) is used as one of the component level descriptor component_level_descriptors( ) of the NST and describes additional signaling information of the corresponding component.

The following is a description of each field of the component_descriptor( ).

In FIG. 12, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by IANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard.

A component_encryption_flag (1-bit) informs whether the corresponding component is encrypted or not.

A Num_STKM_streams field (8-bit) indicates the number STKM streams if component_encryption_flag has been encrypted. (The num_STKM_streams field (8-bit) is an 8-bit unsigned integer field that shall identify the number of STKM streams associated with this component.

A STKIM_stream_id field (8-bit) is repeated as much as the field value of Num_STKM_streams and indicates a value that identifies a SKTM stream that can acquire a key required for decryption.

An NRT_component_data (component_type) element provides the encoding parameters and/or other parameters necessary for rendering this component. The structure of the component_data is determined by the value of component_type field.

For example, if the component_type field value is 35 then NRT_component_data (component_type) field provides component data for H.264/AVC video stream.

In another example, if the component_type field value is 38 then NRT_component_data (component_type) field provides data for FLUTE file delivery as shown in FIG. 13.

One NRT service can be included in multiple FLUTE sessions. Thus, one NRT service may be configured with plurality of FLUTE sessions. Each FLUTE session may be signaled using NRT_component_data( ) as shown in FIG. 13.

FIG. 13 illustrates an example of the bitstream syntax structure of NRT_component_data( ) that provides data for FLUTE file delivery according to the present invention. The following explains each field in the NRT_component_data( ).

A TSI field (16-bit unsigned integer) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end_time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIAS bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth. Also, it shall be one one-thousandth of the Transport Independent Application Specific maximum bandwidth as defined in RFC 3890, rounded up to the next highest integer if necessary. This gives the TIAS bandwidth in kilobits per second.

An as_bandwidth field (16-bit) exists when the as_bandwidth_indicator field value is set to '1' and it indicates the maximum AS bandwidth. Also, this value shall be the Application Specific maximum bandwidth as defined in RFC 4566. This gives the AS bandwidth in kilobits per second.

A FEC_encoding_id field exits when the FEC_OTI_indicator field value is set to '1' and indicates FEC ID used in corresponding FLUTE session. (FEC encoding ID used in this FLUTE session, as defined in RFC 3926).

A FEC_instance_id field exists when the FEC_OTI_indicator field value is set to '1' and indicates FEC instance ID used in the corresponding FLUTE session. (FEC instance ID used in this FLUTE session, as defined in RFC 3926).

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service (or content) is received. The FDT is used to transmit the list of all the content items, and also provides information necessary in acquiring content item and the files included in the content item.

The FDT includes file id which is the only identifier for identifying files included in the content item and instance id which is the only identifier for identifying the corresponding FDT. Moreover, a content linkage which identifies the content item corresponding to the FDT file level or instance level, may be allocated.

As an example, each file that configures the content item can be identified through Content-Location field described in the FDT of the FLUTE session. Another example is identifying each file by content linkage, TOI and Content-Location field described in the FDT of the FLUTE session.

In the present invention, the content linkage, TOI and the Content-Location field is referred to file identifier. The content linkage is to identify the corresponding content, the Transfer Object Identifier (TOI) is to identify the corresponding file, and the content-location is the name of the corresponding file.

NRT Information Table (NRT-IT)

FIGS. 14 and 15 are bit-stream syntax of an NRT-IT section according to an embodiment of the present invention.

The bit-stream syntax of the NRT-IT section is described in MPEG-2 Private section format for ease of understanding the bit-stream syntax of the NRT-IT section, but the format of the data can be in other formats as well. For example, signaling through Session Announcement Protocol (SAP) described by Session Description Protocol (SDP) type is also possible.

In the present invention, the NRT-IT in the NRT service signaling data includes information describing the downloadable content item needed to store the content item in the broadcast receiver. The information provided in the NRT-IT includes the title of the content (for example, the name of the program available for download), the times during which the content is to be made available for download, and information such as content advisories, availability of caption services, content identification, and other metadata. One item of content may consist of one or more files. For example, an audio/video clip may come with a JPEG thumbnail image that can be used to represent it in on-screen displays. The NRT-IT is used to provide information for virtual channels of service_type values 0x08.

An instance of the NRT-IT can include data corresponding to an arbitrarily defined time period, or can describe NRT content starting at a specified time and into the indefinite future. Each NRT-IT instance indicates the start time of the period it covers and the length of the period it covers (which may be indefinite). Each NRT-IT instance may be segmented into as many as 256 sections. One section may contain information for multiple content items, but the information for any given content item shall not be segmented and put into two or more sections.

Any content item to be made available for download for a time interval that extends beyond the time period covered one or more NRT-IT instances shall be described only in the first of these NRT-ITs. Content item descriptions are placed within the NRT_information_table_section( ) in the order of their first availability. Therefore, when last_section_number is greater than zero (meaning the NRT-IT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section).

Each NRT-IT identifies NRT services associated with the given value of NRT_service_id available on a particular virtual channel sometime during the time period it covers.

Here, the determination whether one NRT-IT is configured through one section or plurality of sections can be known through the table_id field, section_number field, last_section_number field, and the like, within the NRT-IT section. And the table may be completed by removing the IP header and the UDP header of the IP datagrams of the NRT service signaling channel and gathering sections having the same table identifier. For example, by gathering the sections having table identifier allocated for NRT-IT, the NRT-IT is completed.

The detailed description of the NRT-IT section fields illustrated in FIGS. 14 and 15 are described below.

A table_id field (8-bit) is set to 0xTBD to identify this table section as belonging to the Non-Real-Time Information Table.

An NRT_service_id field (16-bit) specifies the NRT_service_id field associated with the NRT service offering content items described in this section.

An NRT_IT_version_number field (5-bit) indicates the version number of this NRT-IT instance, where NRT-IT instance is defined as the set of one or more NRT_information_table_section( ) having common values for NRT_service_id field, current_next_indicator field, protocol_version field, and time_span_start field. The version number is incremented by 1 modulo 32 when any field in the NRT-IT instance changes.

A current_next_indicator (1-bit) field is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_ start field and time_span length field are set such that the specified time span does not overlap with any other NRT-IT instance in this IP subnet.

A num_items_in_section field (8-bit) indicates the number of content items described in this NRT-IT section.

The 'for' loop (also referred to as item loop) is executed for number of content items corresponding to the field value of the num_items_in_section and provides signaling information about plurality of content items. Thus, the signaling information of the content item of each content item included in the NRT service corresponding to the NRT_service_id field value is indicated. The following describes the field in each content item that may provide the information.

A content_linkage field (32-bit) in the range 0x0001 to 0xFFFF specifies the identification number of the content (or content item) described. Value 0x0000 is not used. The content_linkage field performs two linkage functions: it links metadata in the NRT-IT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

An updates_available field (1-bit) specifies, when set to '1,' that the referenced content item(s) will be updated. When the updates_available field is set to '0,' updates are not expected to be provided for the associated content item(s), and broadcast receivers are not expected to look for them.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content_descriptors_length field (12-bit) indicates the total length (in bytes) of the content_descriptor ( ).

A content_descriptor( ) is separately applied to each content item.

A descriptors_length field (10-bit) indicates the total length (in bytes) of the descriptor ( ).

A descriptor( ) is commonly applied to all content items described in the current NRT-IT section.

An NRT service, according to the present invention as illustrated in FIG. 2, includes one or more contents (or content items, also referred as NRT contents) and the content includes at least one file.

And the present invention provides one or more additional information regarding the NRT service. Further, the present invention provides one or more additional information regarding the content.

For the convenience of explanation the present invention refers the additional information regarding NRT service as additional NRT service information and additional information regarding content as additional content information.

The additional NRT service information and/or additional content information may be provided through the internet or may be provided in non-real time through the FLUTE session. In an embodiment, the additional NRT service information and/or additional content information is provided in file type.

The additional NRT service information may be a trailer or preview, logo, poster, still-image, commercial, review, information board, music video, or original sound track (OST) regarding the NRT service, and the additional NRT service information may be provided in at least one of still image file, moving picture file, audio file, and text file.

The additional content information may be a trailer or preview, logo, poster, still-image, commercial, review, information board, music video, or original sound track (OST) regarding the content information, and the additional NRT service information may be provided in at least one of still image file, moving picture file, audio file, and text file.

However, in order to receive the additional NRT service information and/or additional content information in the broadcast receiver, the access information of the additional NRT service information and/or additional content information is needed.

Therefore, in an embodiment of the present invention, the access information of the additional NRT service information and/or additional content information is signaled as a field in the signaling information table or in a descriptor format.

The signaling information table includes NST and NRT-IT and the present invention signals the access information of the additional information of at least one of NST and NRT-IT. For example, access information regarding additional NRT service information is signaled in the field or descriptor format of the NST and the access information of the additional content information are signaled in the field or descriptor format of the NST.

In the present invention, the access information of the additional NRT service information is included in the NST as a descriptor format, and the access information of the additional content information is included in the NRT-IT as a descriptor format.

Particularly the access information of the additional NRT service information is included in one of the service level descriptor of the NST, and the access information of the additional content information is included in one of the content level descriptor of the NRT-IT according to an embodiment.

For the convenience of explanation, the access information of the additional NRT service information included in the NST service level descriptor is referred as NRT_service_related_material_descriptor( ), and the access information of the additional content information included in the NRT-IT content level descriptor is referred as NRT_content_related_material_descriptor( ).

FIG. 16 illustrates another bitstream syntax structure of NRT_service_related_material_descriptor( ) provided as one of level descriptors of the NRT service according to an embodiment of the present invention.

The following describes each fields in the NRT_service_related_material_descriptor( ).

Thus, the descriptor_tag field (8-bit) is a descriptor identifier and may be set to identify the NRT_service_related_material_descriptor( ) related to NRT service.

A descriptor_length field (8-bit) indicates, in bytes, the remaining length of the descriptor from a field next to the descriptor_length field to the end of this descriptor.

An URI_count field (5-bit) indicates the number of additional information included in the corresponding NRT service.

The 'for' loop (or also referred to as the additional NRT service information loop) is executed for the number of additional information of the URI_count field value to provide access information of each additional information. Therefore, the access information regarding one or more additional information applied to NRT service corresponding to the NRT_service_id field value of the NST is provided. To provide such information, the additional NRT service information loop further includes at least one of URI_type field, URI_access_type field, Related_type field, RM_service_id field, RM_content_id field, and Recommended_speed filed.

The URI_type field (4-bit) sets the file type of the corresponding additional information.

FIG. 17 illustrates the allocated value and the meaning of the value of the URI_type field.

For example, if the URI_type field value is 0 then it indicates that the additional information is a still video image and if the URI_type field value is 1 then it indicates that the additional information is an audio-only file. Also, if the URI_type field value is 2 then the corresponding additional information is a moving picture file (for example, short moving picture file such as A/V clip) and if the URI_type field value is 3 then the corresponding additional information is a text file.

In FIG. 17, the values and the meaning of the values allocated in the URI_type field are to provide better understanding of the embodiment of the present invention, and adding and deleting the file type included in the URI_type field may be altered by those skilled in the art and is not limited to the embodiments of the present invention.

The URI_access_type field (4-bit) indicates the method of accessing the file of the corresponding additional information.

FIG. 18 illustrates the value and the meaning of the value allocated in the URI_access_type according to an embodiment of the present invention.

For example, if the URI_access_type field value is 0 then it indicates that the file of the corresponding additional information is provided through the FLUTE protocol, if the value is 1 then it indicates that the corresponding additional information is provided through the internet. As a result, if the URI_access_type field value is 0, the access information of the corresponding additional information indicates the URI value needed to access each file transmitted through FLUTE session. The FDT classifies each file in the FLUTE protocol. And if the URI_access_type field value is 1, then the access information of the corresponding additional information indicates the URI value needed to access the corresponding file provided by the internet.

In FIG. 18, the values and the meaning of the values allocated in the URI_access_type field is to provide a better understanding of an embodiment according to the present invention, and the adding or deleting the access method of the file included in the URI_access_type may be altered by those skilled in the art and is not limited to an embodiment of the present invention.

The Related_type field (8-bit) indicates the relations between the corresponding additional information and the corresponding NRT service. Thus, the Related_type field sets the type of the corresponding NRT service.

FIG. 19 indicates the value and the meaning of the value allocated in the Related_type field.

In FIG. 19, if the Related_type field value is 0 then it indicates that the corresponding additional information is a trailer/preview. In one example, if the URI_type field value is 2 and the Related_type field value is 0, then the corresponding additional information is provided as moving picture, and at that moment, the broadcast receiver knows that it is a trailer/preview. In another example, if the URI_type field value is 3 and the Related_type field value is 0, then the corresponding additional information is provided in text, and that it is a trailer/preview provided in text.

If the Related_type field value is 1, then it indicates that the corresponding additional information is either a logo or a poster. In one example, if the URI_type field value is 0 and the Related_type field value is 1, then the corresponding additional information is provided in still images and the broadcast receiver knows that it is a logo or a poster.

If the Related_type field value is 2, then the corresponding additional information is a still shot. In one example, if the URI_type field value is 0 and the Related_type field value is 2, then the corresponding additional information is provided in still images and the broadcast receiver knows that it is a still shot that is being transmitted.

If the Related_type field value is 3, then the corresponding additional information is a commercial advertisement or promotional material. In one example, if the URI_type field value is 2 and the Related_type field value is 3, then the corresponding additional information is provided as moving pictures, and at that point the broadcast receiver knows that it is commercial that is being transmitted.

If the Related_type field value is 4, then the corresponding additional information is a direct product purchase. In one example, if the URI_type field value is 3 and the Related_type filed value is 4, then the corresponding additional information is provided in text, and at that point the broadcast receiver knows that it is a direct product purchase transmitted in text.

If the Related_type field value is 5, then the corresponding additional information is a review. In one example, if the URI_type field value is 3 and the Related_type field value is 5, then the corresponding additional information is provided in text, and at that point the broadcast receiver knows that it is a review transmitted in text.

If the Related_type field value is 6, then the corresponding additional information is a bulletin board. In one example, if the URI_type field value is 3 and the Related_type field value is 6, then the corresponding additional information is provided in text, and at that point the broadcast receiver knows that it is a bulletin board provided in text and the viewers can post opinions or the board can post notices on the bulletin board.

If the Related_type field value is 7, then the corresponding additional information is either a music video or an Original Sound Track (OST). In one example, if the URI_type field value is 2 and the Related_type field value is 7, then the corresponding additional information is provided in moving picture and the broadcast receiver knows that a music video is being provided. In another example, if the URI_type field value is 1 and the Related_type field value is 7, then the corresponding additional information is provided only in audio, and at that time, it is known that the audio provided is an OST.

In FIG. 19, the values and the meaning of the values allocated in the Related_type field are explanation to help understand the embodiment, and the additional information included in the Related_type field can be added or deleted by those skilled in the art and therefore, is not limited to the embodiment illustrated in the present invention.

An RM_service_id field (16-bit) indicates a value identifying the NRT service applied to the additional information. For example, the RM_service_id field value is equal to the NRT_service_id field value of the corresponding NST.

The RM_content_id field (32-bit) indicates a value identifying the content applied to the additional information. For example, the RM_content_id field value is equal to the NRI_IT content_linkage field value which describes the detailed information of the content.

In the present invention, when the URI_access_type field value is 0, in other words, when the corresponding additional information file is provided through FLUTE session in non-real time, the RM_service_id field and the RM_content_id field is valid. On the other hand, if the URI_access_type field value is 1, meaning that the corresponding additional information file is provided through the internet, the RM_service_id field and the RM_content_id field becomes meaningless.

The Recommended_speed field (8-bit) indicates the download speed of the corresponding additional information. The Recommended_speed field may suggest download speed for one or more additional information considering the size and quality of the corresponding additional information. For example, there could be different download speed for the same preview. If there are two recommended downloads for the same additional information, the Recommended_speed field value is changed and the additional information of the NRT service loop is repeated twice. The Recommended_speed field is only valid when the corresponding additional information file is provided through the internet, meaning that the URI_access_type field value is 1. Further, if there are two different download speeds for the same additional information, the system may automatically download the one with the optimal speed or may request the user to select the download depending upon the speed. If user is requested to input the download, then a display is needed to display the download information to the user and to request the user to select the download.

The RM_file_URI_length field (8-bit) indicates the size of the next RM_file_URI field in bytes.

The RM_file_URI field (variable) indicates the URI value of the corresponding additional information file. The RM_file_URI field indicates an URI value which can uniquely identify and download the corresponding additional information in the broadcast receiver.

The URI value indicated by the RM_file_URI field may include the corresponding file information of the FLUTE FDT, IP address/port number of the FLUTE session, or the actual website address.

For example, if the URI_access_type field value is 1, then the RM_file_URI field value includes the information indicating the location of the file, protocol type needed to access the file, or the domain name or IP address of the web server where the file is located. The route of the file location is optional. If the RM_file_URI field value is 'http://www.kbs.co.kr/drama/iris/netizen/bbs/index.html,' then the web browser will use the HTTP protocol and move to web server 'www.kbs.co.kr/drama/iris,' and have accessed the file 'netizen/bbs/index.htm.' In this case, a user bulletin board of the KBS drama 'Iris' is being accessed. Thus, if the URI_access_type field value is 1, it is possible to access the website only by using the RM_file_URI field. And the RM_file_URI field may include the Session description information in which accessing the actual file is possible by using the Session description information.

In another example, if the URI_access_type field value is 0, then the RM_file_URI field value includes the content-location information which is the name of the corresponding additional information described in the corresponding FLUTE FDT. The content-location information becomes the URI value of the file. The RM_file_URI field may further include the directory information of the file or may further include the IP address and the UDP port number of the corresponding FLUTE session.

If the URI_access_type field value is 0, then the RM_file_URI field value may further include the RM_service_id field value, and then specify the NRT service applied to the additional information. Also, the RM_content_id field value may be included in the RM_file_URI field value to specify the content applied to the additional information. Moreover, the RM_Service_id field value and the RM_content_id field value can be further included in the RM_file_URI field value to specify the NRT service and the content applied to the additional information.

Thus, if the additional information file is transmitted through FLUTE session, the RM_File_URI field value of the file can uniquely identify one file transmitted in non-real time through the FLUTE session including the combination of identifier of the corresponding NRT service, identifier of the corresponding content, and the corresponding content location (NRT File URI) described in the FLUTE FDT.

Further, the present invention may provide the same additional information through the internet and the FLUTE session. For example, the same preview may be provided through the internet and the FLUTE session. Thus, the user may be provided with the same additional information in real time through the internet and also in non-real time through the FLUTE session.

FIGS. 20(a) through 20(c) indicate embodiments of User Interface (UI) display processed by the broadcast receiver when receiving the NST including the material descriptor related to the NRT service.

FIG. 20(a) is an embodiment illustrating the service guide display configured using the PSI/PSIP table and the NRT service signaling table (NST, NRT-IT). The display may have both RT service and NRT service or just NRT service as shown in FIG. 20(a). If both RT service and NRT service are displayed, it is possible to distinguish the RT service and the NRT service by displaying in different icons or colors in an embodiment.

If NRT service 2 is selected from the service guide display as shown in FIG. 20(a), the detailed information of the selected NRT service 2 is displayed as illustrated in FIG. 20(b). Here, the area A displays the name that identifies the NRT service 2 and the area B displays the service information acquired from the ETT or the NRT-IT. The area B is optional. And if there are additional information regarding the selected NRT service 2, the material descriptor regarding NRT service including information of the access information of the additional information is included in the NST and received, the additional information may be displayed in the display as a menu button in the bottom of the display.

At this point, if the user inputs through input devices such as a remote control, keyboard, mouse, or touch and selects the additional information button, a display displaying the additional information regarding the selected NRT service 2 is displayed as illustrated in FIG. 20(c).

In FIG. 20(c), the additional information provided through the internet and the additional information available through the FLUTE session is separately displayed as an example.

Thus, FIG. 20(c) illustrates that the information provided through the internet are preview and bulletin board, and the information provided through the FLUTE session (additional information available through NRT) are preview and OST. When provided through the internet, it is possible to download the preview in different speeds; 16K and 32K. In FIG. 20(c), the display is displayed in text for the convenience of the user, but the URI value of the corresponding additional information can also be displayed. Also, the file type, text, or icon of the file corresponding to the additional information may be displayed. For example, if the preview is in moving picture, a text or an icon indicating that the preview is a moving picture may be displayed.

When the user selects 32K preview from the corresponding additional information display menu provided through the internet, the web page is accessed through the URI value of the preview, and the preview is then displayed. And if the user has selected to save the preview, the preview will be transmitted through a speed of 32K and will be stored in the storage of the broadcast receiver.

If the user selects a preview from the list provided through the FLUTE session of the NRT, the broadcast receiver downloads and stores in the storage the selected preview during the corresponding download time. Before downloading the preview, user may be prompted for download, display, or save options. In other words, the user has an option of displaying the downloaded preview immediately after download or can be displayed at a time the user wants the preview to be displayed. Further, a text or an icon may indicate that the preview is yet to be downloaded, download, or finished downloading. For example, if the user clicks on the icon indicating that the download is completed, the preview will be displayed immediately.

FIG. 20(c) illustrates a display when a broadcast receiver is capable of receiving both internet and NRT service. If a broadcast receiver is not capable of receiving an internet, even if the additional information of the NRT service can be provided through the internet and the access information of the material descriptor of the corresponding additional NRT service information is signaled, the possible additional information provided through the internet cannot be displayed as shown in FIG. 20(c). If the list of additional information provided through the internet is displayed, a text or an icon indicating that the fields are inactive may be displayed. Thus a broadcast receiver incapable of receiving internet will have URI_access_type field value of 0 and the additional information based on additional NRT service provided in the loop provided through the FLUTE session can be downloaded.

In another embodiment of the present invention, a text or an icon indicating that there are additional information of the NRT service can be displayed if additional information of a unique NRT service is provided as illustrated in FIG. 20(a).

FIGS. 21(a) to 21(c) illustrate an embodiment of a UI display of a broadcast receiver when a NST including a material descriptor regarding an NRT service is transmitted.

The explanation of FIGS. 21(a) and 21(b) is omitted since it has been explained above in FIGS. 20(a) and 20(b).

When a user selects a menu button indicating that there is additional information using a remote control, keyboard, mouse, or a touch from the display shown in FIG. 21(b), a list indicating the additional information regarding NRT service 2 is displayed as shown in FIG. 21(c).

In FIG. 21(c), a list of additional information provided through the internet and by NRT through the FLUTE session is combined and displayed in an embodiment.

Thus, FIG. 21(c) illustrates additional information which is a preview and a bulletin board provided through the internet, and additional information which are preview and OST provided by FLUTE session through NRT. So, a text or an icon indicating that a preview is provided through internet or through NRT can be shown. A text or an icon indicating that the bulletin board is provided through the internet can be shown. Also, a text or an icon indicating that the OST is only provided through NRT can be shown. Even though the additional information in the list is provided in text for ease of display for the user, the URI value of the corresponding additional information may be displayed. Further, a text or an icon indicating the file type for each corresponding additional information can be displayed. For example, if the preview is provided in moving picture, a text or an icon indicating that the preview can be displayed in moving picture may be displayed.

If the user selects the preview provided through the internet, the web page corresponding to the URI value of the preview will be accessed and displayed. And if the user selects to store the preview, the preview will be downloaded and stored in storage in the broadcast receiver. At this time, the preview will be able to be downloaded in different speeds and the system can automatically select the optimal speed for downloading or prompt the user to select the download speed.

If the user selects a preview provided by FLUTE session through the NRT, the preview is downloaded in to the broadcast receiver at a corresponding download time. A user may be prompted for downloading, displaying and storing the preview before download occurs. In other words, the display can occur immediately after download or can be displayed later when the user selects to display after downloading it in the broadcast receiver. Further, a text or an icon indicating whether the preview is yet to be downloaded, downloading, or finished downloading can be displayed by differentiating the color of the display. In an embodiment, an icon may indicate that the downloading is completed and by pressing such icon, the preview is immediately displayed after downloaded has completed.

FIG. 21(c) illustrates when a broadcast receiver is capable of receiving both internet and NRT service. If the broadcast service does not support internet, even if the additional NRT service can be provided through the internet through material descriptor related to the NRT service and the access information of the additional NRT service is signaled, the additional information provided through the internet will not be displayed in FIG. 21(c). Therefore, there will not be a word referred to 'internet' is FIG. 21(c). So, a broadcast receiver incapable of receiving internet will have an URI_access_type field value of 0 and download additional information based on access information provided by additional information loop of NRT service through FLUTE session.

In another embodiment of the present invention, as shown in FIG. 21(a), if additional information of a specific NRT service is provided in the service guide display, a text or an icon can be indicated next to the NRT service name to inform that there is additional information of such NRT service. In such a case, the user can click the text or the icon to download the additional information using the access information of the material descriptor related to the NRT service of the corresponding NST.

The display shown in FIGS. 20(a) through 20(c) and FIGS. 21(a) through (c) are embodiments to help understand the present invention, and the configuration can be altered by those skilled in the art and the present invention are not limited to the embodiments.

Until now, the method of processing additional information of NRT service provided through service level descriptor of NST included in the material descriptor related to access information of the additional NRT information service has been explained.

The present invention may provide access information of additional content information included in the NRT content related material descriptor as content level descriptor of an NRT-IT.

FIG. 22 illustrates a bitstream syntax structure of an NRT_content_related_material_descriptor( ) provided as one of content level descriptor of NRT-IT.

The following explains each field of the NRT_content_related_material_descriptor( ).

A descriptor_tag field (8-bit) is a descriptor identifier, which identifies the NRT_content_related_material_descriptor( ).

A descriptor_length field (8-bit) indicates the remaining length from the descriptor_length field to the end of this descriptor in bytes.

An URI_count field (5-bit) indicates the number of additional information included in the corresponding content.

A 'for' loop (or referred to as additional content information loop) is executed for the number of additional information corresponding to the URI_count field value and provides access information of each additional information.

Thus, it provides at least one access information of the additional information applied to the content corresponding to the content_linkage field value of NRT-IT. In order to provide such information, the additional content information loop includes at least one of URI_type field, URI_access_type field, Related_type field, RM_service_id field, RM_content_id field, and Recommended_speed field.

The URI_type field (4-bit) indicates the file type of the corresponding additional information.

The URI_access_type field (4-bit) indicates the method of accessing the corresponding additional information file. For example, as illustrated in FIG. 18, if the URI_access_type field value is 0 then the corresponding additional information file is provided through FLUTE protocol, and if the value is 1, then the corresponding additional information file is provided through the internet. Therefore, if the URI_access_type field value is 0 then the access information of the corresponding additional information is indicated as a URI value able to access the corresponding file transmitted through FLUTE session. The FDT in the FLUTE protocol divides each file by the URI value. And if the URI_access_type field is 1, then the access information of the corresponding additional information is indicated by the URI value which can access the corresponding file provided by the internet. If the URI_access_type field value is 1, then value of the URI is indicated which the access information of the corresponding additional information is provided through the internet.

The Related_type field (8-bit) indicates the relations of corresponding additional information and the corresponding content. Thus, the Related_type field indicates the type of the corresponding content. The values and the meaning of the values of the Related_type field are omitted because it was explained earlier in describing FIG. 19.

The RM_service_id field (16-bit) indicates the value identifying the NRT service applied to the additional information. In one example, the RM_service_id field value and the corresponding NRT_service_id field value of the NRT-IT is the same in an embodiment.

The RM_content_id field (32-bit) indicates an identifying value of a content applied to the additional information. In one example, the RM_content_id field value is the same as the content_linkage field value of an NRT-IT describing the detailed information of the content in an embodiment.

The RM_service_id field and the RM_content_id field is only valid when the URI_access_type field value is 0, indicating that the corresponding additional information file is provided through FLUTE session in non-real time. In other words, if the URI_access_type field value is 1, indicating that the corresponding additional information is provided through the internet, the RM_service_id field and the RM_content_id field becomes meaningless.

The Recommended_speed field (8-bit) indicates the download speed of the corresponding additional information. The Recommended_speed field may indicate more than one recommended download speed based on the size and the quality of the same corresponding additional information. For example, same preview might have different download speeds. If there are two recommended download speeds for the same additional information, only the Recommended_speed field value is changed and the additional content information loop is repeated twice. The Recommended_speed field is valid when the URI_access_type field value is 1 indicating that the corresponding additional information file is provided through the internet. Further if there are different download speeds for the same additional information, the system can automatically download the corresponding additional information depending on the optimal speed and also a user can select the download depending upon the speed. If the user selects the download, a display can be displayed for the user to select by displaying the download speed.

The RM_file_URI_length field (8-bit) indicates the size of the next RM_file_URI field in bytes.

The RM_file_URI field (variable) indicates the URI value of the corresponding additional information file. The RM_file_URI field indicates an URI value of the corresponding additional information file in the broadcast receiver that can be uniquely identified and downloaded.

The URI value indicated in the RM_file_URI field includes file information of FLUTE FDT and the IP address/port number of the FLUTE session. The actual website address can also be included.

For example, if the URI_access_type field value is 1, the RM_file_URI field value includes protocol type needed to access the file, domain name or IP address of the web server containing the file, and the route indicating the location of the file. The route indicating the file location is optional. For example, if the RM_file_URI field value is 'http://www.kbs.co.kr/drama/iris/netizen/bbs/index.html,' then the web browser uses HTTP protocol, the web server locates to 'www.kbs.co.kr/drama/iris,' and access file name 'netizen/bbs/index.html.' In such a case, a web site showing the viewer opinion on the drama "Iris" broadcasted by KBS is accessed. Thus, if the URI_access_type value is 1, it is possible to access the website only using the RM_file_URI field. Further, the RM_file_URI field may include Session description information, and it is possible to receive the actual file using the Session description information.

In another example, if the URI_access_type field value is 0, the RM_file_URI field value includes content-location information which is the file name of the corresponding additional information described by the FLUTE FDT. The content-location information becomes the URI value of the file. The RM_file_URI field may further include directory information of the file.

If the URI_access_type field value is 0, the RM_file_URI field value may further include the RM_service_id field value, and specify the NRT service applied to the additional information. Further the RM_file_URI field value may further include RM_content_id field value, to specify the content applied to the additional information. Also, the RM_file_URI field value may include RM_Service_id field value and RM_content_id field value to specify the NRT service and content applied to the additional information.

Thus, when the additional information file is transmitted through FLUTE session, the RM_file_URI field value of the file combines and indicates the corresponding NRT service identifier, corresponding content identifier, and corresponding content location information (NRT File URI) described in FLUTE FDT, so that it is possible to uniquely identify one file transmitted in non-real time through the FLUTE session.

Moreover, the present invention may provide the same additional information through the internet and through the FLUTE session. For example, same preview may be provided through the internet and the FLUTE session. Therefore, the user can be provided with the same preview through the internet in real time, and also through the FLUTE session in non-real time.

Through NRT-IT, which includes material descriptor related to NRT content as shown in FIG. 22, the broadcast receiver may configure a UI display illustrated in FIG. 20(a) through (c) or FIG. 21(a) through (c).

At this point, the additional content information list, not additional NRT service information list is displayed in the display as shown in FIG. 20(c) or FIG. 21(c). In this situation, when a specific NRT service is selected from the service guide display, a content list included in the selected NRT service is display and the user will be able to select one of the content as shown in FIG. 20(c) or FIG. 21(c).

The detailed explanation regarding the additional information list is omitted since everything else explained above regarding FIG. 20(a) through (c) are the same except for the fact that each additional information are related to the content.

In another embodiment of the present invention, a text or an icon can be displayed next to the content name when additional information regarding a specific content within a content list is provided. In such a case, a user can click the text or the icon corresponding to the content to download the additional information through the access information of the material descriptor related to the NRT content of the corresponding NRT-IT.

Up until now, the method of downloading additional NRT service information and/or additional content information using the access information signaled by NST or NRT-IT through the access information of NRT service and/or content of the additional information.

In the present invention, the additional content information may be provided through NRT-IT and not through the internet or the FLUTE session. In such a case, there is no need to have the access information to receive the additional content information. The IP datagram of NST and NRT-IT included in the NRT service signaling channel has the same well-known IP address and the well-known UDP port number. Therefore, it is possible to obtain the additional content information by acquiring the NRT-IT included in the NRT service signaling channel.

At this point, the additional content information may include aspect ratio, resolution, name of the series, or other content information related to the additional content information provided by the NRT-IT.

For the convenience of explaining the present invention, the content level descriptor of NRT-IT signaling the additional content information is referred to as content_additional_information_descriptor( ).

FIG. 23 illustrates a bitstream syntax structure of the content_additional_information_descriptor( ) which is provided as one of the content level descriptor according to the present invention.

The following explains in detail of each content_additional_information_descriptor( ) field.

A descriptor_tag field (8-bit) is a descriptor identifier and may be set to identify the content_additional_information_descriptor( ).

A descriptor_length field (8-bit) indicates the remaining length of the descriptor from the descriptor_length field to the end of this descriptor in bytes.

An aspect ratio field (4-bit) indicates the aspect ratio of the corresponding content. Thus, a broadcast receiver is able to know before downloading the content whether the corresponding content is in 4:3 low bit encoded contents or 16:0 wide screen contents, so the field value is used in determining the download of the corresponding content. For example, it is assumed that if the field value is 0 then it is 4:3 low bit encoded content, and if the field value is 1 then it is 16:9 wide screen content.

A resolution field (4-bit) indicates the resolution of the corresponding content. A broadcast receiver is able to know the resolution of the corresponding content before downloading the corresponding content, so this field may be used in downloading the corresponding content. In the present invention, if the field value is 0 then the resolution of the corresponding content is 480I (Interlaced), if the value is 1 then it is 480P (Progressive), if the value is 2 then it is 720P, if the value is 3 then it is 1080I, and if the value is 4 then it is 1080P in an embodiment. In another embodiment, the resolution of the content may be determined in the decoding unit after the broadcast receiver has finished downloading the corresponding content.

A series_name_length field (8-bit) indicates the size of the series_name_text( ) field which comes next, if the corresponding content is a series. A broadcast receiver according to the present invention uses the series_name_length field to determine whether the corresponding content is a series or not. In an embodiment of the present invention, if the content does not belong to a series then the series_name_length field value is 0 and if the content belong to a series then the value of the series_name_text( ) field which follows will indicate the length.

The series_name_text( ) field (variable) will indicate the name of the series that the content belongs to if the corresponding content corresponds to a specific series. In an embodiment, the name in the series_name_text( ) field is indicated in a Multiple String Structure (MSS) format.

A num_of_related_content field (8-bit) indicates the number of different content related to the corresponding content.

The 'for' loop (or referred to as content related information loop) is executed for the number of related contents corresponding to the num_of_related_content field value to provide information regarding each related content.

In order for the execution, the content related information loop includes content_linkage field, content_name_length field, content_name_text( ) field, and start_time field.

The content_linkage field (32-bit) indicates the corresponding related content identifier.

The content_name_length field indicates the size of the content_name_text( ) field which follows, in bytes.

The content_name_text( ) field (variable) indicates the name of the corresponding related content. In an embodiment, the corresponding related content name in the content_name_text( ) field is in a MSS format.

The start_time field (32-bit) indicates the available download time for the corresponding related content. In one example, the start_time field value is described in GPS time so a broadcast receiver knows when the corresponding related content may be downloaded.

In the present invention, one or more additional information related to an event of a real-time service through the internet or through the FLUTE session. For the convenience of explanation in the present invention, the additional information related to an event of a RT service is referred to as additional event information. In an embodiment, the additional event information is provided in file format.

Thus, the additional event information corresponding to an event of an RT service may be a trailer or preview, logo, poster, still shot, commercial, review, bulletin board, music video, and OST, and the information is provided in at least one of still picture, moving picture, audio file, and text files.

In an embodiment of the present invention, the access information of the additional event information is signaled via a descriptor format, the descriptor included in the EIT. In an embodiment of the present invention, the access information of the additional event information is included in one of the event level descriptor within the EIT.

For the convenience of explaining the present invention, the access information of the additional event information included in the event level descriptor within the EIT is referred to as RT_event_related_material_descriptor( ).

FIG. 24 illustrates a bitstream syntax structure of an RT_event_related_material_descriptor( ) according to an embodiment of the present invention.

The following describes the each fields of the RT_event_related_material_descriptor( ).

A descriptor_tag field (8-bit) is a descriptor identifier used set to identify RT_event_related_material_descriptor( ).

A descriptor_length field (8-bit) indicates the remaining length of a descriptor after the descriptor_length field to the end of this descriptor, in bytes.

An URI_count field (5-bit) indicates the number of additional information included in the corresponding event.

A 'for' loop (or referred to as additional event information loop) is executed for the number of additional information corresponding to the URI_count field value and provide the access information of each additional information. Thus, it provides access information of one or more additional event information corresponding to the event_id field value within the EIT. In order to execute it, the additional event information loop includes RM_file_URI_length field and RM_file_URI field. The additional event information loop may also include at least one of URI_type field, URI_access_type field, Related_type field, RM_service_id field, RM_event_id field, and Recommended_speed field.

The URI_type field (4-bit) indicates the file type of the corresponding additional information. The value and the meaning of the value allocated to the URI_type field have been explained with FIG. 17 and are omitted.

The URI_access_type field (4-bit) indicates the method of accessing the corresponding additional information file. For example, as illustrated in FIG. 18, if the URI_access_type field value is 0 then it indicates that the corresponding additional information file is provided through the FLUTE protocol, and if the value is 1 then the corresponding additional information file is provided through the internet. Therefore, if the URI_access_type field value is 0, then the access information of the corresponding additional information indicates the URI value needed to access the corresponding file transmitted through the FLUTE session. In other words, the FDT in the FLUTE protocol classifies each file in to URI values. Moreover, if the URI_access_type field value is 1, then the access information of the corresponding additional information indicates the URI value needed to access the corresponding file transmitted through the internet.

The Related_type field (8-bit) indicates the relations between the corresponding additional information and the corresponding event. The Related_type field indicates the type of the corresponding event. The value allocated to the Related_type field and the meaning have been explained with FIG. 19 and are omitted here.

The RM_service_id field (16-bit) indicates a value in identifying the RT service applying the additional information. In one example, the RM_service_id field value equals to the source_id field value of the corresponding EIT according to an embodiment.

The RM_event_id field (14-bit) indicates the value in identifying the event applying the additional information. In one example, the RM_event_id field value is equal to the event_id field value within the EIT according to an embodiment.

In the present invention, the RM_service_id field and the RM_event_id field is valid when the URI_access_type field value is 0, meaning that the corresponding additional information file is provided through the FLUTE session in non-real time. In other words, if the URI_access_type field value is 1, meaning that the corresponding additional information is provided through the internet, the RM_service_id field and the RM_event_id field becomes meaningless.

The Recommended_speed field (8-bit) indicates the download speed of the corresponding additional information. The Recommended_speed field may consider the size and the quality of the corresponding additional information in suggesting a download speed if there are more than one download speeds on the same additional information. For example, there could be different download speeds on the same preview. If there are two download speeds for the same additional information, the Recommended_speed field value gets changed and the additional content information loop will repeat twice. The Recommended_speed field is valid when the URI_access_type field value is 1, meaning that the corresponding additional information file is provided through the internet. Further, if there are more than one download speeds for the same one additional information, the user may select which to download depending on the speed or the system can automatically download depending upon the optimal download speed. If the user gets to select the download speed, a display is provided so that the user knows the download speed of the corresponding additional information and select from the display.

The RM_file_URI_length field (8-bit) indicates the size of RM_file_URI field which follows, in bytes.

The RM_file_URI field (variable) indicates the URI value of the corresponding additional information. The RM_file_URI field must indicate a URI value which uniquely identifies and downloads the corresponding additional information file from the broadcast receiver. The URI value in the RM_file_URI field has been explained and is omitted here.

Through EIT, which includes material descriptor related to RT content as shown in FIG. 24, the broadcast receiver may configure a UI display illustrated in FIG. 20(a) through (c) or FIG. 21(a) through (c).

At this point, the additional content information list, not additional NRT service information list is displayed in the display as shown in FIG. 20(c) or FIG. 21(c). In this situation, when a specific RT service is selected from the service guide display, a content list included in the selected RT service is displayed and the user will be able to select one of the content as shown in FIG. 20(c) or FIG. 21(c). Since, except for the fact that the additional information in the additional information list is related to the additional event information, all the detailed information has been explained earlier with FIG. 20(a) through (c) or FIG. 21(a) through (c), the detailed explanation is omitted.

Previously explained method of signaling and processing the access information of Fixed NRT service and/or additional content information can also be applied to Mobile NRT service and/or content. Thus, the access information of the Mobile NRT service and/or additional content information are signaled in one of the signal information table including the NRT service signaling channel and using the access information, the corresponding additional NRT service information and/or corresponding additional content information is downloaded through the internet or the FLUTE session.

The signaling information table for Mobile NRT service according to the present invention is in the Service Map Table (SMT).

The SMT provides access information of real time and non-real time service included in the mobile broadcast and the component (or content item) included in each service. The SMT is a signaling information table which corresponds to NST in a Fixed NRT service. If the service included in the mobile broadcast is NRT service, then the signaling information of the access information of the FLUTE session where the content/file are configured for NRT service from the SMT may be extracted.

The NRT_service_related_material_descriptor( ) related to NRT service as illustrated in FIG. 16 is provided as one of the service level descriptor of the SMT.

Therefore, according to the present invention, a mobile broadcast receiver may acquire file type, service type, and access information of the additional NRT service information file from the NRT_service_related_material_descriptor( ) in the SMT. The detailed information regarding the NRT_service_related_material_descriptor( ) was explained above with FIG. 16 through FIG. 19, therefore, it is omitted here.

A UI display may well be configured as illustrated in FIG. 20(a) through (c) or FIG. 21(a) through (c).

Figure 25:
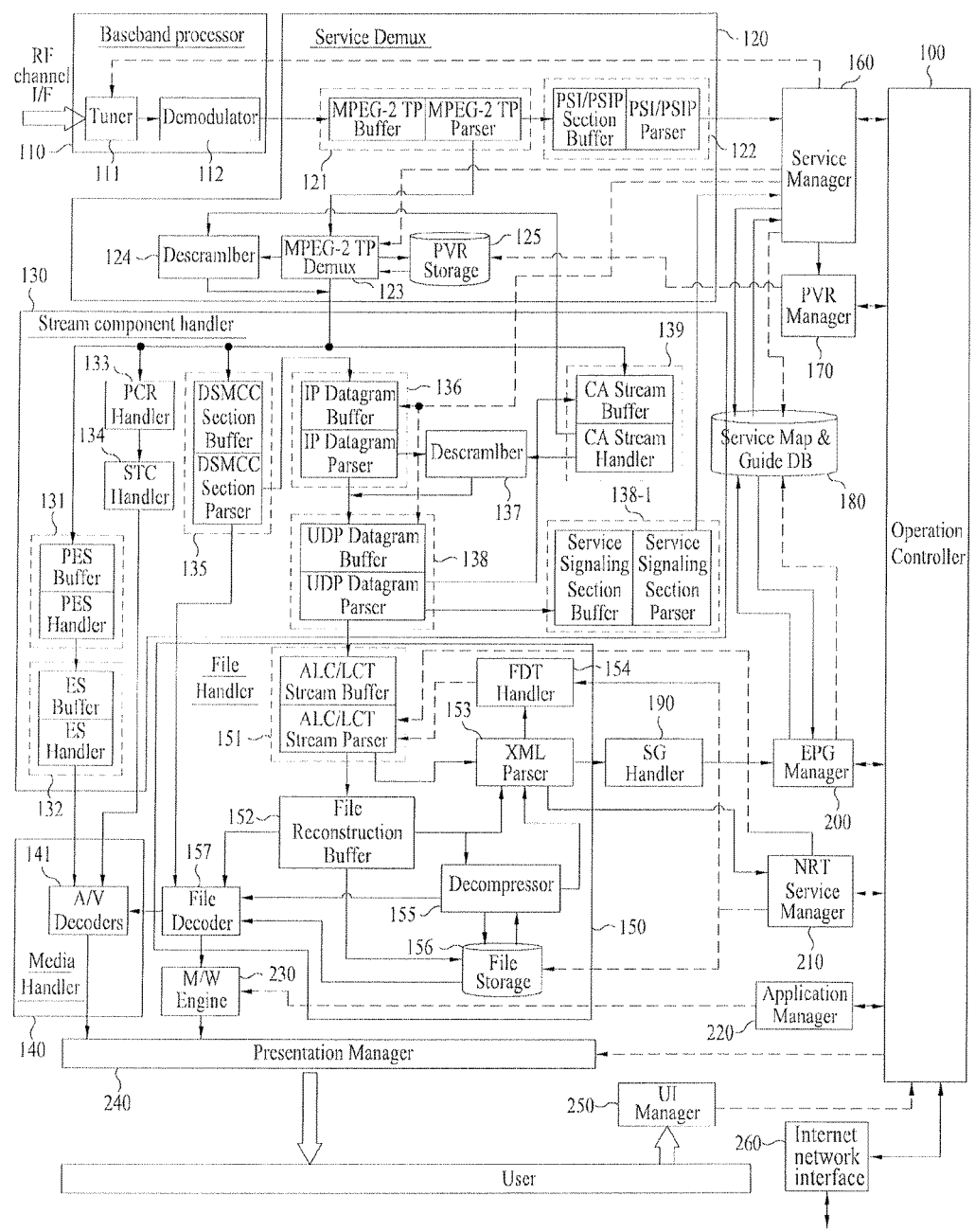
FIG. 25 is a block diagram illustrating a broadcast receiver that provides a Fixed NRT service according to an embodiment of the present invention.

FIG. 25 is a block diagram of a broadcast receiver for a Fixed NRT service according to an embodiment of the present invention.

The broadcast receiver in FIG. 25 includes Operation Controller 100, Baseband process 110, Service Demux 120, Stream component handler 130, Media Handler 140, File Handler 150, Service Manager 160, PVR Manager 170, Service Map & Guide DB 180, SG Handler 190, EPG Manager 200, NRT Service Manager 210, Application Manager 220, MiddleWare Engine 230, Presentation Manager 240, UI Manager 250, and Internet network interface 260.

The Baseband process 110 includes Tuner 111 and Demodulator 112. The Service Demx 120 includes MPEG-2 TP Handler, PSI/PSIP Handler 122, MPEG-2 TP Demux 123, Descrambler 124 and PVR Storage 125.

The Stream component handler 130 includes Packetized Elementary Stream (PES) decoder 131, Elementary Stream (ES) decoder 132, PCR Handler 133, STC Handler 134, DSM-CC Addressable Section Handler 135, IP Datagram Handler 136, Descrambler 137, UDP Handler 138, Service Signaling Section Handler 138-1, and Conditional Access System (CAS) 139.

The Media Handler 140 includes A/V Decoders 141. The File Handler 150 includes ALC/LCT Stream Handler 151, File Reconstruction Buffer 152, XML Parser 153, FDT Handler 154, Decompressor 155, File Storage 156, and File Decoder 157.

The Tuner 111 for example in FIG. 25 detects signal transmitted over the terrestrial system with the control from the Service Manager 160 and tunes only the wanted channel, down converts to Intermediate Frequency (IF), and outputs to Demodulator 112. The Tuner 111 may receive both real time stream and non-real time stream. In the present invention, non-real time stream is referred to as NRT stream.

The Demodulator 112 receives digital IF signal of pass bandwidth inputted from the Tuner 111 and performs automatic gain control, reconstructs carrier frequencies and timing to convert into baseband signal and equalizes the channel. For example, if the broadcast signal is a VSB modulated signal, a VSB demodulation process is executed for automatic gain control, and reconstructs carrier frequencies and timing. In the Demodulator 112, demodulated and equalized channel data is outputted to MPEG-2 TP Handler 121 in a MPEG-2 Transport Stream (TS) packet format.

The MPEG-2 TP Handler 121 is configured of MPEG-2 TP Buffer and MPEG-2 TP Parser, temporarily stores the Demodulater 112 output and then analyzes TS Header, and outputs to MPEG-2 TP Demux if the Demodulator 112 output is a real time A/V TS packet or NRT TS packet and outputs to PSI/PSIP Handler 122 if the output is a TS packet for PSI/PSIP table.

The PSI/PSIP Handler 122 is configured of PSI/PSIP Section Buffer and PSI/PSIP Parser, and temporarily stores the outputted TS packet from the MPEG-2 TP Handler 121 to reconstruct the corresponding table from PSI/PSIP Section data included in the payload of TS packet with referencing table identifier and then parse it. At this time, it is possible to find out whether one table is configured by one section or plurality of sections by the table_id field, section_number field, and last_section_number field within the corresponding section. Further, completing the corresponding table is possible by gathering sections having identical table identifiers. For example, it is possible to complete a VCT by gathering the sections having table identifiers allocated to VCT. Also, each of the parsed table information is collected by Service Manager 160 and then stored in Service Map & Guide DB 180. The VCT, PAT, PMT, DST, EIT, ETT and the like, are stored in Map & Guide DB 180 after going through the process. The Service Manager 160 stores the table information in the Service Map & Guide DB 180 in the Service Map & Guide DB format.

The MPEG-2 TP Demux 123 divides audio TS packet and video TS packet and then outputs to PES Decoder 131 if the TS packet is real time A/V TS packet and outputs to DSM-CC Handler 135 if it is an NRT TS packet. Also, the MPEG-2 TP Demux 123 outputs to PCR Handler 133 if the TS packet includes Program Clock Reference (PCR) and outputs to CAS 139 if the TS packet includes Conditional Access (CA) information. The NRT TS packet is divided into TS packet including NRT service data and TS packet including NRT service signaling channel. A unique PID is allocated to identify the NRT service in the TS packet of the NRT service data and the PID of the TS packet including the NRT service signaling channel is extracted using DST and PMT.

The MPEG-2 TP Demux 123 outputs to the Descrambler 124 if the payload of the inputted TS packet is scrambled and the Descrambler 124 receives descrambling information needed for descrambling (for example, control word used in scrambling) from the CAS 139 and performs descrambling of the TS packet.

The MPEG-2 TP Demux 123 stores A/V packet of real time from any one of the record, timed-record, or time shift request in the PVR storage 125. The PVR storage 125 is a mass storage device, an example of it can be a HDD. The download (storage) and upload (playing) in the PVR storage 125 is controlled by the PVR Manager 170.

The MPEG-2 TP Demux 123 outputs to PES Decoder 131 by dividing the audio TS packet and video TS packet from the uploaded A/V TS packet of the PVR storage.

The MPEG-2 TP Demux 123, in order to perform such functions, is controlled by Service Manager 160 and/or PVR Manager 170.

Thus the Service Manager 160 receives DST by extracting the PID of the DST from the service location descriptor (or ES loop of PMT) of the VCT when the service_type field value indicates that NRT service is transmitted.

Further, NRT service is identified through the received DST, and extracts DST and PMT by using the PID of MPEG-2 TS including NRT service signaling channel. The extracted PID is outputted to the MPEG-2 TP Demux 123. The MPEG-2 TP Demux 123 outputs to Addressable Section Handler 135 the MPEG-2 TS packets corresponding to PID outputted by the Service Manager 160.

The PCR is a standard time value used in syncing audio ES and video ES in the A/V Decoder 141. The PCR Handler 133 outputs to STC Handler 134 reconstructed PCR included in the payload of the inputted TS packet. The STC Handler 134 outputs to A/V Decoder 141 reconstructed System Time Clock (STC) which is the standard clock from the system by the PCR.

The PES Decoder 131 is configured with PES Buffer and PES Handler, temporarily stores audio TS packet and video TS packet and removes TS header from each TS packet and reconstructs to audio PES and video PES. The reconstructed audio PES and video PES is outputted to the ES Decoder 132. The ES Decoder 132 is configured with ES Buffer and ES Handler, removes each PES header from audio PES and video PES and reconstructs audio ES and video ES which are pure data.

The A/V Decoder 141 uses each decoding algorithms to decode the audio ES and video ES and reconstructs to pre-compressed status and then outputs to Presentation Manager 240. At this point, depending on the STC, the time sync is executed when audio ES and video ES are decoding. In one example, the audio decoding algorithm may apply at least one of AC-3 decoding algorithm, MPEG 2 audio decoding algorithm, HE AAC decoding algorithm, AAC SBR decoding algorithm, AAC+ decoding algorithm, HE AAC decoding algorithm, AAC SBR decoding algorithm, MPEG surround decoding algorithm, and BSAC decoding algorithm, and the video decoding algorithm may apply at least one of MPEG 2 video decoding algorithm, MPEG 4 video decoding algorithm, H.264 decoding algorithm, SVC decoding algorithm, and VC-1 decoding algorithm.

The CAS 139 is configured with Stream Buffer and CA Stream Handler, and the TS packet outputted from the MPEG-2 TP Handler 121 or the service protection data reconstructed and outputted from the UDP Datagram Handler 138 is temporarily stored and then reconstruct the needed information (control word used in scrambling) to descramble the stored TS packet or the service protected data. Thus, the CAS 139 acquires necessary information to descramble after extracting the Entitlement Management Message (EMM) and Entitlement Control Message (ECM) included in the payload of the TS packet, and then by analyzing the extracted EMM and ECM. The ECM may include the Control Word (CW) used in scrambling. The CW may be encrypted using the authentication key. The EMM may include authentication key of the corresponding data and the requirements information. The acquired information necessary for descrambling from the CAS 139 will be outputted to the Descrambler 124, 137.

The DSM-CC Section Handler 135 is configured with DSM-CC Section Buffer and DSM-CC Section Parser, temporarily stores the TS packet outputted from the MPEG-2 TS Demux 123 and then reconstructs the addressable section included in the payload of the TS packet, and outputs to the IP Datagram Handler 136 after removing the header and the CRC checksum from the addressable section and then reconstructing the IP Datagram. The IP Datagram Handler 136 is configured with IP Datagram Buffer and IP Datagram Parser, and after buffering the IP datagram delivered from the DSM-CC Section Handler 135, extracts and analyzes the header of the buffered IP datagram and then outputs to the UDP Datagram Section Handler 138 after reconstructing the UDP datagram from the payload of the IP datagram.

At this point, if the IP datagram is scrambled, the scrambled UDP datagram is descrambled in the Descrambler 137 and then outputted to the UDP Datagram Handler 138. In one example, the Descrambler 137 gathers information needed for descrambling (for example, control words needed for scrambling) from the CAS 139 and descrambles the UDP datagram and then outputs to the UDP Datagram Handler 138.

The UDP Datagram Handler 138 is configured with UDP Datagram Buffer and UDP Datagram Parser, and after buffering the UDP datagram outputted from the IP Datagram Handler 136 or the Descrambler 137, extracts and analyzes the header of the buffered UDP datagram and reconstructs the data included in the payload of the UDP datagram. At this point, if the reconstructed data is service protection data then it is outputted to CAS 139 and if it is NRT service signaling data, then it is outputted to service signaling section handler 138-1, and if it is NRT service data then it is outputted to ALC/LCT stream handler 151.

In an embodiment, the access information of the IP datagram transmitting NRT service signaling channel is a well-known destination IP address and well-known destination UDP port number.

Therefore, the IP Datagram Handler 136 and UDP Datagram Handler 138 has well-known destination IP multicast address and well-known destination UDP port number, and the IP multicast stream which transmits NRT service signaling channel, extracts the NRT service signaling data and outputs to Service Signaling Section Handler 138-1.

The Service Signaling Section Handler 138-1 is configured with Service Signaling Section Buffer and Service Signaling Section Parser, and outputs to Service Manager 160 the reconstructed and parsed NRT-IT received from the NRT Service Signaling Data such as the NST illustrated in FIG. 10 and FIG. 11, and the NRT-IT illustrated in FIG. 14 and FIG. 15. The access information of the FLUTE session transmitting content/files configuring NRT service can be acquired when the NST is parsed. The parsed information from NST and NRT-IT is collected by the Service Manager 160 and then stored in the Service Map & Guide DB 180. The Service Manager 160 stores the extracted information from the NST and the NRT-IT in the Service Map & Guide DB 180 in the Service Map & Guide format. In another embodiment, NRT Service Manager 210 can perform the task that the Service Manager 160 performs. Thus, the parsed information from the NST and the NRT-IT may be collected by the NRT Service Manager 210 and then stored in the Service Map & Guide DM 180.

Moreover, when the user requests a guide screen through the UI Manager 250, the Operation Controller 100 will control the Service Manager 160 or the NRT Service Manager 210 to use the information stored in the Service Map & Guide DB 180 to configure a service guide by selecting at least one of RT service and NRT service, and from the configured service guide the Presentation Manager 240 displays in a display the guide screen.

In one example, FIG. 20(*a*) illustrates the service guide screen that is displayed.

In this case, it is assumed that the material descriptor related to the NRT service including the access information of the additional NRT service 2 related information is provided from the service level descriptor corresponding to the NRT service 2.

At this moment, when the user uses input device such as remote controller, keyboard, mouse, or touch and selects NRT service 2 from the service guide screen as illustrated in FIG. 20(*a*), then the selected signal is provided to the Operation Controller 100 through the UI Manager 250.

And then the Service Manager 160 or the NRT Service Manager 210, the Service Map & Guide DB 180, Presentation Manager 240 will operate under the control of the Operation Controller 100 to display the detailed information of the NRT service 2 as shown in FIG. 20(*b*).

When the user inputs through input devices such as remote controller, keyboard, mouse, or touch to select the menu button in the detailed information display of NRT service 2 as shown in FIG. 20(*b*), the additional information related to the NRT service 2 will be displayed as shown in FIG. 20(*c*).

FIG. 20(*c*) illustrates an example of a display that can classify the additional information list available through the internet and the additional information list available by the NRT through the FLUTE session. The additional information item within the list is illustrated in text for the convenience of the user, but as an example, the corresponding additional information may be displayed as the URI value. Further the file type of the corresponding additional information indicating the item in the additional list can by illustrated as a text or an icon. For example, if the preview is provided as a moving picture, then a text or an icon may indicate that the preview is available in moving picture.

When the user selects the bulletin board from the additional information list provided through the internet, the Service Manager 160 or the NRT Service Manager 210 obtains (reads) the URI value of the bulletin board acquired from the material descriptor related to the NRT service 2 from the Service Map & Guide DB 180. Then, through the Internet network interface 260, the web page corresponding to the URI value of the bulletin board is accessed. The bulletin board is displayed in the screen.

If the user selects the preview from the additional information list provided by the NRT, the NRT Service Manager 210 controls and downloads the preview from the corresponding FLUTE session at the download time. The downloaded preview file is stored in the File Storage 156 through the File Decoder 157 or is displayed on the screen through the Presentation Manager 240.

Before the NRT Service Manager 210 downloads the selected preview, the user is prompted to select to download, display, or store the preview. So, the downloaded preview can be displayed immediately or can be stored in the storage and displayed at a later time at the request by the user. Further it is possible to indicate by text, icon, or color in the display by the item or in the full screen whether the preview is downloading or has completed download. In one example, an icon may be used to indicate whether it is before the download, during the download, or finished downloading and when the icon indicating that the download is completed is selected, then by clicking the icon, the preview will be displayed.

It is also possible to use the process described above to acquire the access information of the additional information when the material descriptor related to the NRT content including the access information of the additional information related to the content is provided through the content level descriptor of the NRT-IT. Also, according to the acquired access information, the corresponding additional content information may be downloaded through the internet and/or the FLUTE session.

The XML Parser 153 analyzes the XML data transmitted through ALC/LCT session and if the analyzed data is filed-based service then it is outputted through the FDT Handler 154 and if it is a data for service guide, then it is outputted to SG Handler 190.

The FDT Handler 154 analyzes and processes the File Description Table of the FLUTE protocol through the ALC/

LCT session. The FDT Handler 154 is controlled by the NRT Service Manager 210 if the received file is for the NRT service.

The SG Handler 190 gathers and analyzes the data for the service guide transmitted in XML structure, and then outputs to the EPG Manager 200.

The File Decoder 157 decodes the file outputted from the File Reconstruction Buffer 152, file outputted from the Decompressor 155, or filed uploaded from the File Storage 156 using the pre-selected algorithm and outputs to the Middleware (M/W) Engine 230 or to the A/V Decoder 141.

The M/W Engine 230 interprets and executes the application, which is the data of the file structure. Further, through the Presentation Manager 240, the application may be outputted to an output device such as a screen or a speaker. In an embodiment, the M/W Engine 230 is a JAVA platform based M/W Engine.

The EPG Manager 200, depending upon the input from the user, outputs the service guide data after converting into a display format received from the SG Handler 190 to the Presentation Manager 240. The Application Manager 220 manages the handling of the application data received in a file format.

The Service Manager 160 gathers and analyzes the NRT service signaling data transmitted through the PSI/PSIP table data or the NRT service signaling channel and creates a service map and the stores in the PVR Storage 125. The Service Manager 160 controls the access information of the NRT service that the user wants and controls the Tuner 111, Demodulator 112, and the IP Datagram Handler 136.

The Operation Controller 100 according to the command from the user through the UI Manager 250, controls at least one of the Service Manager 160, PVR Manager 170, EPG Manager 200, NRT Service Manager 210, Application Manager 220, and the Presentation Manager 240, and executes the user's command.

The NRT Service Manager 210 manages the NRT Service transmitted in content/file format through the FLUTE session on the IP layer.

The UI Manager 250 delivers the user's input through the UI to the Operation Controller 100.

The Presentation Manager 240 provides the user through a speaker and/or a screen at least one of the audio and video data outputted from the A/V Decoder 141, file data outputted from the M/W Engine 230, and service guide data outputted from the EPG Manager 210.

According to the present invention, the additional information related to the NRT service and/or the additional information related to the content is provided to the NRT in file format through the internet or the FLUTE session, signaling the access information (location information) of the downloadable additional information in the signaling information table so that it is easy to download the additional information related to the NRT service and/or the content provided through the internet of the NRT.

The present invention is not limited to the above embodiments and it will be apparent to those skilled in the art that various modifications can be made to in the present invention as can be seen from the appended claims and such modifications are included in the scope of the invention.

What is claimed is:

1. A method of transmitting a broadcast signal for non-real time service, the method comprising:
generating the broadcast signal having a non-real time service/content, and signaling data for signaling the non-real time service/content, the non-real time service/content being a broadcast service/content that are delivered in advance of its use,
wherein the signaling data includes a service information element containing service-level attributes for a non-real time broadcasting and a non-real time information element containing information describing non-real time contents available for download to a storage in a broadcast receiving device, the service information element including service identifier identifying non-real time service, wherein the service information element further includes information used as a linkage to the non-real time information element from the service information element; and
transmitting the non-real time service/content and the signaling data via a broadcast channel,
wherein the non-real time information element further includes a content linkage element to link from the non-real time content to files delivered in one or more file transport sessions, the files belonging to the non-real time content,
wherein the service information element further includes status information identifying a status of the non-real time service, and
wherein the signaling data further includes source IP address information specifying a source address of an IP datagram carrying a IP stream component of the non-real time service.

2. The method of claim 1, wherein the service information element further includes component number information specifying a number of IP stream components in the non-real time service.

3. A television for receiving a broadcast signal for non-real time service, the television is configured to:
receive the broadcast signal having a non-real time service/content, and signaling data for signaling the non-real time service/content, the non-real time service/content being a broadcast service/content that are delivered in advance of its use via a broadcast channel;
parse a service information element containing service-level attributes for a non-real time broadcasting from the signaling data, obtain service identifier identifying a non-real time service from the service information element, wherein the service information element further includes information used as a linkage to a non-real time information element from the service information element, and link to the non-real time information element containing information describing non-real time contents available for download to storage in a broadcast receiving device; and
store the non-real time content based on information of the non-real time information element;
wherein the non-real time information element further includes a content linkage element to link from the non-real time content to files delivered in one or more file transport sessions, the files belonging to the non-real time content,
wherein the service information element further includes status information identifying a status of the non-real time service, and
wherein the signaling data further includes source IP address information specifying a source address of an IP datagram carrying a IP stream component of the non-real time service.

4. The television of claim 3, wherein the service information element further includes component number information specifying a number of IP stream components in the non-real time service.

* * * * *